United States Patent
Bakker et al.

(10) Patent No.: US 9,462,616 B2
(45) Date of Patent: *Oct. 4, 2016

(54) SYSTEM AND METHOD FOR MANAGING EMERGENCY REQUESTS

(71) Applicant: BlackBerry Limited, Waterloo (CA)

(72) Inventors: Jan Hendrik Lucas Bakker, Keller, TX (US); Adrian Buckley, Tracy, CA (US); Andrew Michael Allen, Hallandale Beach, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,686

(22) Filed: Dec. 14, 2015

(65) Prior Publication Data
US 2016/0100435 A1 Apr. 7, 2016

Related U.S. Application Data

(63) Continuation of application No. 12/937,199, filed as application No. PCT/US2009/045990 on Jun. 2, 2009, now Pat. No. 9,215,734, which is a continuation of application No. 12/131,785, filed on Jun. 2, 2008, now Pat. No. 8,478,226.

(60) Provisional application No. 61/061,507, filed on Jun. 13, 2008, provisional application No. 61/081,576, filed on Jul. 17, 2008.

(51) Int. Cl.
H04M 11/04 (2006.01)
H04W 76/00 (2009.01)
(Continued)

(52) U.S. Cl.
CPC ........ H04W 76/007 (2013.01); H04L 65/1006 (2013.01); H04L 65/1016 (2013.01); H04L 65/1069 (2013.01); H04L 65/40 (2013.01); H04M 3/42348 (2013.01);
(Continued)

(58) Field of Classification Search
USPC .............. 455/404.1, 404.2, 456.1, 456.3
See application file for complete search history.

(56) References Cited

U.S. PATENT DOCUMENTS 6,091,362 A  7/2000  Stilp et al.
6,198,914 B1  3/2001  Saegusa
(Continued)

FOREIGN PATENT DOCUMENTS

CN  1222807  7/1999
CN  101132623  2/2008
(Continued)

OTHER PUBLICATIONS

"All-IP Network Emergency Call Support," 3GPP2, 3GPP2 X. P0049-0, Version 1.0, Nov. 7, 2007, pp. 1-68, XP06210045, retrieved from the Internet: URL:http://ftp.3gpp2.org/TSGX/Working/2007/TSG-X-2007-11-Osaka/TR45.2-2007-11-Osaka/452-20071108-19TIA-1111ballot/ [retrieved on Nov. 7, 2007], paragraphs [7.2.1], [8.1.2], [08.3], [08.6].
(Continued)

Primary Examiner — Joel Ajayi
(74) Attorney, Agent, or Firm — Fish & Richardson P.C.

(57) ABSTRACT

A network component is provided. The network component including a component configured such that the network transmits a response message containing an indicator indicating that a first message is an emergency-related request, and such that the network receives a second message containing information associated with a user equipment (UE).

40 Claims, 6 Drawing Sheets

(51) Int. Cl.
  *H04W 4/22* (2009.01)
  *H04L 29/06* (2006.01)
  *H04M 3/42* (2006.01)
  *H04M 7/00* (2006.01)
(52) U.S. Cl.
  CPC .......... *H04W 4/22* (2013.01); *H04M 3/42068* (2013.01); *H04M 7/006* (2013.01); *H04M 2242/04* (2013.01)

(56) References Cited

U.S. PATENT DOCUMENTS

| | | |
|---|---|---|
| 6,687,504 B1 | 2/2004 | Raith |
| 6,738,808 B1 | 5/2004 | Zellner et al. |
| 6,766,159 B2 | 7/2004 | Lindholm |
| 7,050,785 B2 | 5/2006 | Islam et al. |
| 7,116,967 B2 | 10/2006 | Kauppinen et al. |
| 7,245,900 B1 | 7/2007 | Lamb et al. |
| 7,336,962 B2 | 2/2008 | Levitan |
| 7,702,081 B1 | 4/2010 | Klesper et al. |
| 7,738,855 B2 | 6/2010 | Jang et al. |
| 8,040,862 B1 | 10/2011 | Rosenberg et al. |
| 8,200,185 B2 | 6/2012 | Edge et al. |
| 8,305,210 B2 | 11/2012 | Bakker et al. |
| 8,369,824 B2 | 2/2013 | Bakker et al. |
| 8,442,479 B2 | 5/2013 | Bakker et al. |
| 8,478,226 B2 | 7/2013 | Bakker et al. |
| 8,755,765 B2 | 6/2014 | Bakker et al. |
| 2005/0003797 A1 | 1/2005 | Baldwin |
| 2005/0233727 A1 | 10/2005 | Poikselka et al. |
| 2006/0018272 A1 | 1/2006 | Mutikainen et al. |
| 2007/0060097 A1 | 3/2007 | Edge et al. |
| 2007/0117539 A1 | 5/2007 | Harris |
| 2007/0117577 A1 | 5/2007 | Harris |
| 2007/0143423 A1 | 6/2007 | Kieselbach et al. |
| 2007/0149166 A1 | 6/2007 | Turcotte et al. |
| 2007/0254625 A1 | 11/2007 | Edge |
| 2007/0260739 A1 | 11/2007 | Buckley et al. |
| 2007/0274289 A1 | 11/2007 | Buckley et al. |
| 2008/0008157 A1 | 1/2008 | Edge et al. |
| 2008/0063153 A1 | 3/2008 | Krivorot et al. |
| 2008/0267171 A1 | 10/2008 | Buckley et al. |
| 2008/0310599 A1 | 12/2008 | Purnadi et al. |
| 2009/0047922 A1 | 2/2009 | Buckley et al. |
| 2009/0296688 A1 | 12/2009 | Bakker et al. |
| 2009/0296689 A1 | 12/2009 | Bakker et al. |
| 2009/0298458 A1 | 12/2009 | Bakker et al. |
| 2011/0099281 A1 | 4/2011 | Bakker et al. |
| 2011/0119340 A1 | 5/2011 | Van Elburg et al. |

FOREIGN PATENT DOCUMENTS

| | | |
|---|---|---|
| EP | 1906638 | 4/2008 |
| JP | 2005-525030 | 8/2005 |
| JP | 2007-172625 | 7/2007 |
| JP | 2009-535944 | 10/2009 |
| WO | 03009627 | 1/2003 |
| WO | 03094563 | 11/2003 |
| WO | 2007016695 | 3/2007 |
| WO | 2007127991 | 11/2007 |
| WO | 2008022554 | 2/2008 |

OTHER PUBLICATIONS

"Presence Information Data Format (PIDF)," Internet Engineering Task Force (IETF) Network Working Group, Request for Comments: 3863, pp. 1-28, Aug. 2004, [retrieved on Dec. 19, 2012 from: http://tools.ietf.org/html/rfc3863].
"Private Header (P-Header) Extensions to the Session Initiation Protocol (SIP) for the 3rd-Generation Partnership Project (3GPP)," Internet Engineering Task Force (IETF) Network Working Group, Request for Comments: 3455, pp. 1-34, Jan. 2003.
"SIP: Session Initiation Protocol," Internet Engineering Task Force (IETF) Network Working Group, Request for Comments: 3261, pp. 1-269, Jun. 2002, [retrieved on Dec. 19, 2012 from: http://tools.ietf.org/html/rfc3261].
3GPP ETSI TS 124 008, Apr. 2008, version 7.11.0, pp. 1-551.
3GPP TS 24.229 V7.11.0, Technical Specification Group Core Network and Terminals, IP Multimedia Call Control Protocol Based on Session Initiation Protocol (SIP) and Session Description Protocol (SDP), Stage 3, Release 7, Mar. 2008, 434 pages.
3GPP TS 24.229 V7.11.0, Technical Specification Group Core Network and Terminals, IP Multimedia Call Control Protocol Based on Session Initiation Protocol (SIP) and Session Description Protocol (SDP), Stage 3, Release 7, Section 5.1.2A, Mar. 2008, pp. 1-15 and 49-53.
3GPP TS 24.229 V8.3.0 Release 8, ETSI TS 124 229 v8.3.0, Digital Cellular Telecommunications System (Phase 2+): Universal Mobile Telecommunications System (UMTS), Internet Protocol (IP) Multimedia Call Control Protocol Based on Session Initiation Protocol (SIP) and Session Description Protocol (SDP), Stage 3, Apr. 2008, 498 pages.
3GPP TS 24.229 v8.3.0, Release 8, ETSI TS 124 229 v8.3.0, Digital Cellular Telecommunications System (Phase 2+): Universal Mobile Telecommunications System (UMTS), Internet Protocol (IP) Multimedia Call Control Protocol Based on Session Initiation Protocol (SIP) and Session Description Protocol (SDP), Stage 3, Apr. 2008, 1-125, Part 1.
3GPP TS 24.229 v8.3.0, Release 8, ETSI TS 124 229 v8.3.0, Digital Cellular Telecommunications System (Phase 2+): Universal Mobile Telecommunications System (UMTS), Internet Protocol (IP) Multimedia Call Control Protocol Based on Session Initiation Protocol (SIP) and Session Description Protocol (SDP), Stage 3, Apr. 2008, 376-497, Part 4.
3GPP TS 24.229 v8.3.0, Release 8, ETSI TS 124 229 v8.3.0, Digital Cellular Telecommunications System (Phase 2+): Universal Mobile Telecommunications System (UMTS), Internet Protocol (IP) Multimedia Call Control Protocol Based on Session Initiation Protocol (SIP) and Session Description Protocol (SDP), Stage 3, Apr. 2008, 251-375, Part 3.
3GPP TS 24.229 v8.3.0, Release 8, ETSI TS 124 229 v8.3.0, Digital Cellular Telecommunications System (Phase 2+): Universal Mobile Telecommunications System (UMTS), Internet Protocol (IP) Multimedia Call Control Protocol Based on Session Initiation Protocol (SIP) and Session Description Protocol (SDP), Stage 3, Apr. 2008, 126-250, Part 2.
3GPP TS 24.229 v8.3.0, Technical Specification Group Core Network and Terminals, IP Multimedia Call Control Protocol Based on Session Initiation Protocol (SIP) and Session Description Protocol (SDP), Stage 3, Release 8, Mar. 2008, 495 pages.
3GPP TS 24.403 v1.8.1, Technical Specification Group Core Network and Terminals, Telecommunications and Internet Converged Services and Protocols for Advanced Networking (TISPAN), IP Multimedia Call Control Protocol based on Session Initiation Protocol (SIP) and Session Description Protocol (SDP), Stage 3, Release 7, Dec. 2007, 96 pages.
3GPP TS 24.403, v1.8.1, Technical Specification Group Core Network and Terminals, Telecommunications and Internet Converged Services and Protocols for Advanced Networking (TISPAN), IP Multimedia Call Control Protocol based on Session Initiation Protocol (SIP) and Session Description Protocol (SOP), Dec. 1, 2007, XP050365362, pp. 1-96, paragraphs [5.2.6.3], [5.2.7.2], [5.2.10.2].
3GPP TSG CT WG1 24.229 v8.4.1 Meeting #54, 24.229, Change Request, CR 2321, C1-082335, Zagreb, Croatia, Jun. 23-27, 2008, 20 pages.
3GPP TSG CT WG1 Meeting #49, "Corrections for Emergency Procedures," C1-072991, Nokia Siemens Networks, Nokia, Ericsson, Kobe, Japan, Oct. 8-12, 2007, 8 pages.
3GPP TSG SA WG2 Architecture—S2 #50, Basic Call Flow of North America IMS Emergency Session Establishment, S2-060406, Jan. 16-20, 2005.
Jennings et al., "Private Extensions to the Session Initiation Protocol (SIP) for Asserted Identity within Trusted Networks," RFC 3325, Nov. 1, 2002, XP015009093, ISSN: 0000-0003, 19 pages.

(56) References Cited

OTHER PUBLICATIONS

Nokia Siemens Networks et al., "Corrections for emergency procedures," 3GPP Draft; C1-072991_24229CR1997R2_EMC1_REL-8 Procedure, 3rd Generation Partnership Project (3GPP), vol. CTWG1, Nov. 12, 2007, XP050027161, 7 pages.
Rosen et al., "Best Current Practices for Communications Services in Support of Emergency Calling," Feb. 27, 2006, draft-rosen-sos-phonebcp-00.txt.
Schulzrinne, "A Uniform Resource Name (URN) for Emergency and other Well-Known Services," Jan. 2008, RFC 5031, pp. 1-15.
Taylor et al., "Security Threats and Requirements for Emergency Call Marking and Mapping," Jan. 2008, RFC 5069, 13 pages.
European Search Report in European Application No. 12172479.3, dated Sep. 11, 2012, 6 pages.
European Search Report in European Application No. 12177729.6, dated Sep. 3, 2012, 9 pages.
European Search Report in European Application No. 13162547.7, dated Jul. 11, 2013, 10 pages.
European Search Report in European Application No. 13162615.2, dated Jul. 15, 2013, 8 pages.
European Search Report in European Application No. 15156206.3, dated Jun. 16, 2015, 5 pages.
International Preliminary Report on Patentability in International Application No. PCT/US2009/045987, dated Dec. 6, 2010, 7 pages.
International Preliminary Report on Patentability in International Application No. PCT/US2009/045990, dated Dec. 6, 2010, 6 pages.
International Preliminary Report on Patentability in International Application No. PCT/US2009/045992, dated Dec. 6, 2010, 8 pages.
International Search Report in International Application No. PCT/US2009/045987, dated Sep. 7, 2009, 3 pages.
International Search Report in International Application No. PCT/US2009/045990, dated Sep. 7, 2009, 3 pages.
International Search Report in International Application No. PCT/US2009/045992, dated Sep. 15, 2009, 3 pages.
International Written Opinion in International Application No. PCT/US2009/045987, dated Sep. 7, 2009, 6 pages.
International Written Opinion in International Application No. PCT/US2009/045990, dated Sep. 7, 2009, 6 pages.
International Written Opinion in International Application No. PCT/US2009/045992, dated Sep. 15, 2009, 7 pages.
SIP: More Than You Ever Wanted to Know About; Mar. 2007; 242 pages.
RFC 4474 Enhancements for Authenticated Identity Management in the Session Initiation Protocol (SIP); Aug. 2006; 38 pages.
RFC 5012 Requirements for Emergency Context Resolution with Internet Technologies; Jan. 2008; 22 pages.
Office Action issued in related Chinese Application No. 200980130796.X on Apr. 11, 2016.
Communication Pursuant to Article 94(3) EPC issued in European Application No. 09759257.0 on Jul. 6, 2016.

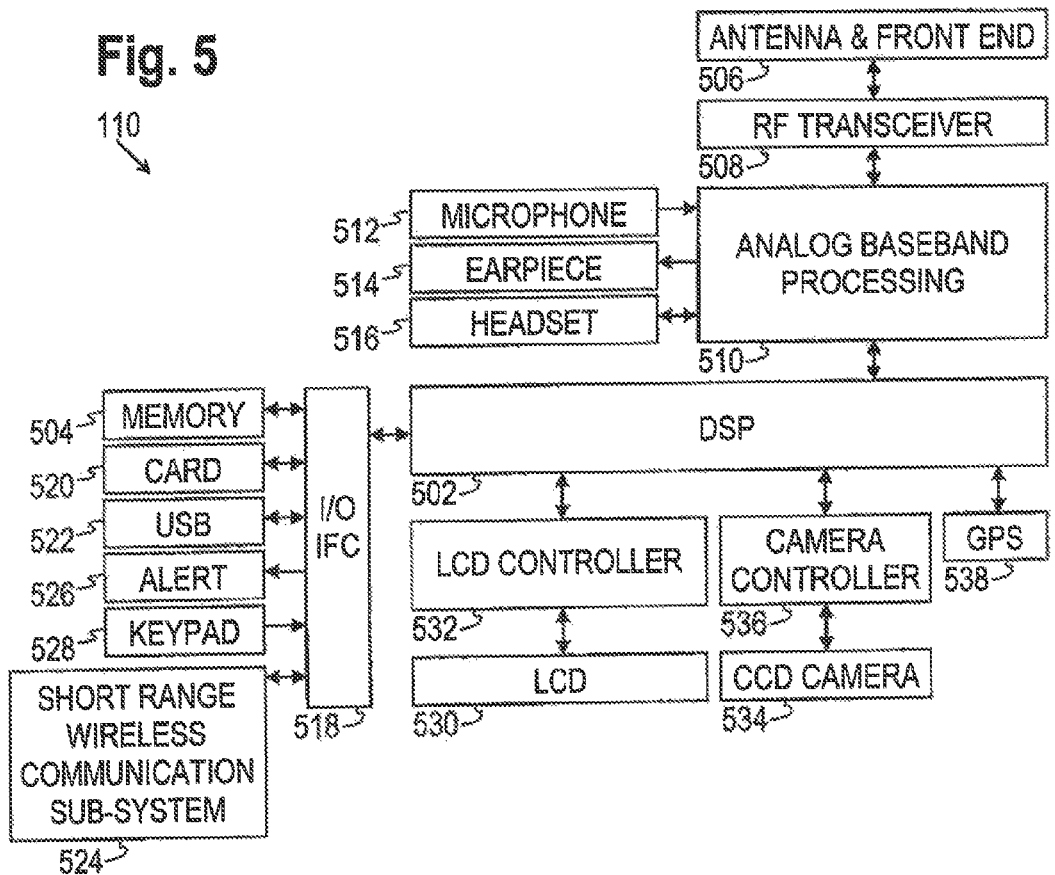
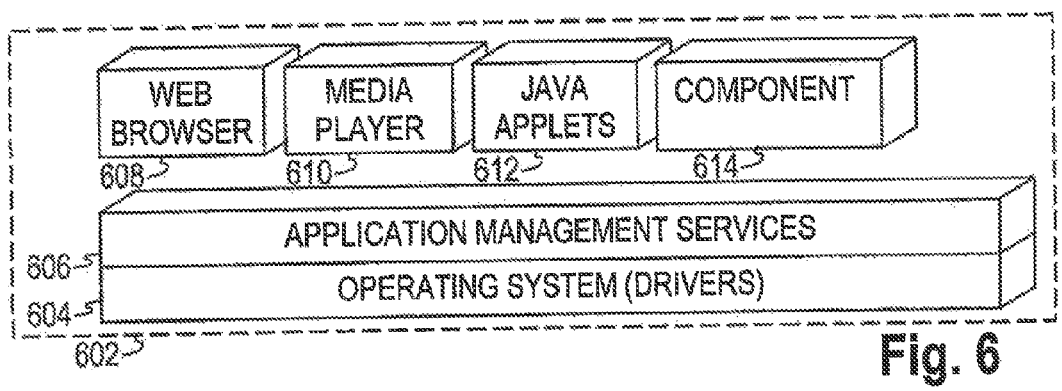

SYSTEM AND METHOD FOR MANAGING EMERGENCY REQUESTS

CROSS-REFERENCE TO RELATED APPLICATIONS

This application is a continuation of U.S. patent application Ser. No. 12/937,199 filed on Jan. 13, 2011, which is a filing under 35U.S.C. 371 of International Application No. PCT/US2009/045990 filed Jun. 2, 2009, entitled "System and Method for Managing Emergency Requests" claiming priority to U.S. patent application Ser. No. 12/131,785 filed on Jun. 2, 2008, and claiming priority to U.S. Provisional Application No. 61/061,507 filed on Jun. 13, 2008, and claiming priority to U.S. Provisional Application No. 61/081,576 filed on Jul. 17, 2008 which these applications are incorporated by reference herein in their entirety.

BACKGROUND

The IP (Internet Protocol) Multimedia Subsystem (IMS) is a standardized architecture for providing multimedia services and voice-over-IP calls to both mobile and fixed user equipment (UE). The Session Initiation Protocol (SIP) been standardized and governed primarily by the Internet Engineering Task Force (IETF) as a protocol for setting up and managing IMS-based calls. As used herein, the term "UE" can refer to mobile devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar capabilities but that are not transportable, such as fixed line telephones, desktop computers, or set-top boxes. The term "UE" can also refer to any hardware or software component that can terminate a SIP session.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a block diagram of user equipment operable for some of the various embodiments of the disclosure.

FIG. 6 is a diagram of a software environment that may be implemented on user equipment operable for some of the various embodiments of the disclosure.

DETAILED DESCRIPTION

Figure 1:
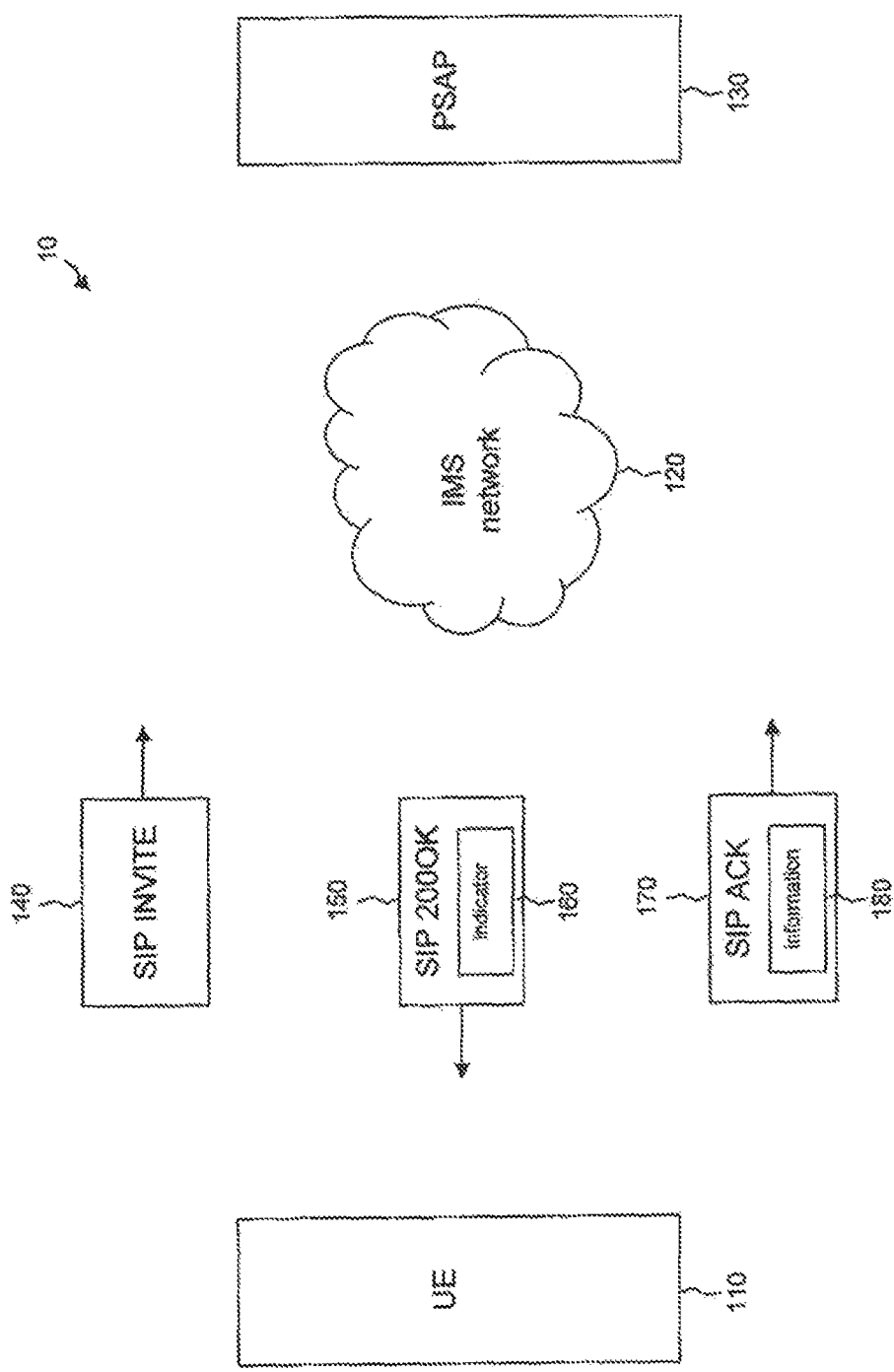
FIG. 1 is a diagram of an illustrative IP network including a UE and a PSAP according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a user equipment is provided. The user equipment including a component, such that responsive to making an emergency request that is rejected, the component configured to receive a message containing information associating the emergency request with a combined emergency centre.

In another embodiment, a network component is provided that includes a component, such that upon receiving an emergency request from a user equipment, the component configured to determine whether the emergency request is related to a combined emergency centre and to send the user equipment a message containing information identifying that the emergency request is related to a combined emergency centre.

A user of a UE, such as an IMS-capable UE, can typically place an emergency call by dialing 911 (in North America), 112 (in most of Europe), 999 (in the United Kingdom), 110, 118, or 119 (in Japan), or some other emergency-specific number. Such a call may be handled by a Public Safety Answering Point (PSAP), which might be an emergency call center or system that can coordinate an appropriate response to the emergency. Any call made to a PSAP will be referred to herein as an emergency call. In this document, a PSAP could also be an emergency centre or emergency centers.

In some cases, a UE might not be aware that a call that it placed was an emergency call. For example, a UE manufactured for use in North America might be programmed to recognize that a call to 911 is an emergency call. If such a UE is taken to a country where a number other than 911 is used for emergency calls, and the UE user dials that other emergency number, the UE might not recognize the call as an emergency call. Undesirable results may occur if the UE does not recognize that a call is an emergency call. For example, the UE could fail to provide relevant information to the PSAP, the UE may treat the call as a regular call and place it on hold or call waiting, the call could be blocked, or the UE might otherwise fail to treat the call appropriately. In addition, the network may not apply special treatment, for example, in a congested network or cell, and the unrecognized emergency call may not be subjected to emergency call procedures (e.g., may not receive priority).

The present disclosure provides for indicating to a UE that a call that the UE placed was an IMS emergency call by including in a message to the UE an indicator that the call was an emergency call. The indicator might be included in a SIP message that may be but is not limited to a SIP 2xx or SIP 1xx message sent to the UE in response to an initial SIP request for a dialog or standalone transaction, or unknown method (e.g., a SIP INVITE request), or a similar message, that the UE sends in attempting to set up the emergency call. Hereinafter, the term "SIP message" may refer to a SIP request (including, e.g., a re-INVITE request or a Target refresh request for a dialog or an initial SIP request for a dialog or standalone transaction, or an unknown method) or a SIP response. It should be noted that the re-INVITE method request can only be sent when conditions documented in the Internet Engineering Task Force (IETF) Request for Comments (RFC) 3261 are satisfied. The SIP message that includes the indicator might be sent by the PSAP or by a component of a network through which the PSAP and the UE communicate with one another. Examples of such components are P-CSCF and E-CSCF.

The emergency-related indicator can be encoded in SIP using the following alternatives: a) SIP bodies such as "application/3gpp-ims+xml" have been used in IMS to indicate additional information or directives to receiving UAs. It can be extended to also indicate to the UE that, upon receipt in an INVITE or similar request, the request is to be taken as an emergency call or PSAP callback and that the functionality associated with calls of such type is to be invoked. This functionality may include but it not limited to alerting the user by visual, audible, or other methods as well as including location information in the response. A new content-disposition header field value may need to be defined. b) A new SIP header could be defined or an existing SIP header could be enhanced. The PSAP itself or the S-CSCF handling the PSAP call back on behalf of the PSAP or another network element such as a signaling gateway can introduce an indicator. c) The indicator could be a new SIP header field. d) The indicator could be a new SIP header field value, e.g., a standardized SIP URN indicating the PSAP function (e.g. mountain rescue or coast guard or general 911) or emergency centre function or emergency personnel function. e) The indicator could be a new URI field. f) The indicator could be a new URI field value, e.g., user=psap, where 'user' is a SIP URI field and 'psap' is a new value that might be put in the Contact header field. g) The standardized SIP URN could be put in the P-Asserted-Identity by the trust domain in which the PSAP or emergency centre or emergency personnel resides. h) The indicator could be contained in the FROM header field value and the FROM header field value can be asserted according to RFC 4474 or RFC 3893. This solution is based on certificates.

As identified above, a number of possibilities could be used to indicate that a session is in fact an emergency session. It has been highlighted that the PSAP could be in a visited network such as a VPLMN network and has no trust relationship with the home network such as an HPLMN (Home Public Land Mobile Network). Assuming this is the case when the UE is setting up an emergency session the UE doesn't recognize or when receiving a mobile terminated request containing an indication in the SIP message (e.g., 1xx or 2xx responses or a SIP target refresh request or a similar message) that the request is a PSAP callback, the PSAP or the network could also send back a token that the UE would store. The network could provide this token when the UE registers with IM core network (CN) subsystem. The token could be stored in memory, which could be internal or removable. In the event the UE's emergency call is disconnected or the UE needs to be informed it is requesting an emergency session, the network or PSAP could include this token. Upon receipt of the token from the network, the UE can compare it to the shared token. If the tokens do not match, the UE knows the call is not emergency related.

The SIP "priority" header field set to "emergency" has so far not been used as a trusted indicator for emergency call [RFC 3261]. The installed base of SIP UAs will have different and diverging treatment for this header, if any treatment.

In the event the PSAP callback or emergency call signaling response is received over a Circuit Switched network, the solution can allow for mapping between appropriate Calling-Party-Category fields which is sometimes used to carry the indication of an emergency call in ISUP/TUP (ISDN User Part/Telephone User Part) based systems. Typically, the ISUP/TUP signaling information does not allow for a granularity as fine as the emergency urn:service:sos identifiers defined in RFC 5031.

FIG. 1 illustrates a system 10 that includes one or more components associated with an IMS network 120. A UE 110 may be any end user device or system that can connect to the IMS network 120. Examples of the UE 110 can include, but are not limited to, mobile phones, fixed line phones, mobile wireless devices (including digital, cellular, or dual mode devices), personal digital assistants, laptop/tablet/notebook computers, and desktop computers. The UE 110 can communicate via the IMS network 120 with a PSAP 130, which may be a 911 system or another emergency call center or system.

The IMS network 120 might include any well known set of components, such as base stations and other radio transmission and reception equipment, that can promote an IMS-based connection between the UE 110 and the PSAP 130. Other components that might be present in the IMS network 120 but that are not shown include a P-CSCF (Proxy Call Session Control Function) that may be the first point of contact for the UE 110; an S-CSCF (Serving CSCF) that may perform session control, downloading and uploading of user profiles, and other functions; an E-CSCF (Emergency CSCF) that may provide session control functions for the PSAP 130; and other well known components for initiating and maintaining IMS-based sessions.

To make an emergency call, the UE 110 might send an initial SIP request for a dialog or standalone transaction, or unknown method (e.g. a SIP INVITE request) 140, or a similar invitation message, to the PSAP 130 via the IMS network 120. The PSAP 130 typically responds to the invitation message 140 with a SIP 1xx or SIP 2xx response (e.g., SIP 200 OK) message 150, or a similar response message. Alternatively, the PSAP 130 could transmit a target refresh request (e.g. re-INVITE request). Standard SIP procedures might then be followed to establish the emergency call between the UE 110 and the PSAP 130.

In an embodiment, the response message 150 includes an indicator 160 that indicates that the call placed by the UE 110 was an emergency call. The indicator 160 may be a bit, a flag, or some other data element that is recognizable by the UE as a designation that a call placed by the UE 110 was an emergency call (e.g., emergency service URNs as specified in RFC 5031 such as urn:service:sos, urn:service:sos.animal-control, or urn:service:sos.police, if it is determined that the call that was placed can be categorized as, e.g., a urn:service:sos call, a urn:service:sos.animal-control call, or a urn:service:sos.police call). When the UE 110 receives the response message 150 that includes the indicator 160, the UE 110 identifies that the call it placed was an IMS emergency call and can then take appropriate actions and invoke functionality for an emergency call. One action that the UE 110 might take is to indicate to the UE user the nature of the original call. That is, the UE 110 might alert the user that the call was an emergency call. The alert might be a message that appears on the display screen of the UE 110, a visual or audible alert, or some other type of environmental condition or indication of the nature of the call. Other actions taken by the UE 110 can involve transmitting a SIP request message 170 such as a SIP ACK or SIP PRACK message or any subsequent SIP request part of the dialog (including target refresh requests) or request for a new dialog, where the request for the dialog uses the SIP Target-Dialog header field with a value set identical to the corresponding dialog identifier value for the emergency session. In the case of sending a request for a new dialog message 170 with SIP Target-Dialog header field set, it can indicate to the recipient that the sender is aware of an existing dialog with the recipient, either because the sender is on the other side of that dialog, or because it has access to the dialog identifiers, the recipient can then authorize the request based on this awareness. Subject to limitations of SIP, either of these messages can include information in the request as part of information available to the PSAP 130 if the recipient is the PSAP 130. As mentioned, the message 170 might be a SIP target refresh request, a SIP UPDATE, a SIP re-INVITE message 170, or a similar (acknowledgement) message (e.g. SIP PRACK). The message 170 can include information 180 about the UE 110, to be described in detail below. Due to limitations in the SIP protocol, the information 180 may be spread over several SIP messages, e.g. some information may be in SIP PRACK requests, some in responses to PSAP- or network-originated requests or SIP UPDATE requests, and some in other SIP target refresh requests. The information 180 might be intended for the PSAP 130 or for one or more components in the IMS network 120. The information 180 could optionally include a flag or other indicator that indicates that certain emergency-related information, such as identification, network access, and location information, is not to be shared (e.g., with the PSAP 130). If one or more privacy indicators are set, the network might still be able to use the emergency-related information for routing purposes or to provide anonymous call-back.

In another embodiment, a policy could be stored in the UE 110. The policy or policies can be used to determine if including one or more indicators to request privacy when requesting emergency sessions is allowed, or if emergency-related information is provided when a PSAP makes a call-back, or if it is allowed to request privacy when emergency-related information is provided in response to a PSAP call-back. The policy could be consulted when the UE 110 wants to divulge information that is sensitive to privacy, such as, but not limited to, location. The policy could be user-provided, operator-provided, or both. When the information is both user-provided and operator-provided, the operator might provide a default policy, but the user might be able to override this policy if they so wish. The policy can be stored in memory that is either internal or external to the device.

It is possible that the policy/preference could be set up in a way that is against the PSAP's regulatory requirements. For example, the UE 110 might come from a country where it can choose whether or not to provide user-related or event-related information, and the policy/preference may be set such that the information will not be provided. Alternatively, the policy/preference may be set such that the information may be provided (e.g., for the purposes of determining the nearest PSAP), but a request might be made that the information not be released. The UE 110 may subsequently go to a country where by law location information must be provided if available. In such cases, the network might signal to the UE 110 that the policy/preference is overridden and that information must be provided. This override notification could be signaled as a token in a message from the network. For example, a SIP message could contain a token that is coded as a new feature tag, a new URI parameter, an XML body, an SDP parameter, or a similar coding feature. The token might also need the property that it can be trusted by the UE 110.

The following illustrates one possible embodiment of how the UE 110 may behave.

Basic procedure will be
    Policy / Preference set
        Message received from network containing override token
            Consult preference / policy
                Allow location information provide
                Not allowed determine if token received
                      Token received ascertain authenticity of token and if valid provide location information
                      Token received, fake, provide indication to network fake token received, provide no location information.

The token could be carried in a callback from the PSAP 130, such as a SIP INVITE. Alternatively, the token could be provided at the time the UE 110 makes registration with the network 120, such that in IMS the token could be provided in a SIP 200OK message in response to an emergency registration. Within the 200OK, if the token is coded as a new feature tag, a new URI parameter, or an XML body, the token might be a secure token. In an LTE/SAE network, the 200OK message could be transmitted in response to a request to attach to the network or as part of the authentication sequence of the UE 110.

Another embodiment is that the VPLMN policy could be broadcast in a system message indicating the behavior of the UE should it receive an emergency callback.

The provisioning of the policy can be performed in, but is not limited to, one of the following ways: OMA DM, CP, OTA, proprietary, or other. When being provisioned, any of the following transports could be used: Cell Broadcast, SMS, USSD, MBMS, Generic IP pipe, or other.

The policy might be stored in internal or external memory. External memory might be, but is not limited to, PC Card PCMCIA, CompactFlash I CF-I, CompactFlash II CF-II, SmartMedia SM/SMC, Memory Stick MS, Memory Stick Duo MSD, Memory Stick PRO Duo MSPD, Memory Stick PRO-HG Duo MSPDX, Memory Stick Micro M2, Multimedia Card MMC, Multimedia Card RS-MMC, MMCmicro Card MMCmicro, Secure Digital Card SD, SxS SxS, Universal Flash Storage UFS, miniSD Card miniSD, microSD Card microSD, xD-Picture Card xD, Intelligent Stick iStick, Serial Flash Module SFM, µ card µ card, NT Card NT NT+, USIM, R-UIM, etc.

In one embodiment of the policy information, there would be a file on the removable memory consisting of eight bits for each file. Bit 1 (the Least Significant Bit) might be set to 1 to indicate that location information is to be provided, or to 0 to indicate that location information is not to be provided. All remaining seven bits could be reserved (RFU). The user preference file could be under PIN control (i.e., the user could, after entering the PIN, control the content of the file), and the operator file could be under ADM (Administrative) control, preventing any party, other than the administrator (the card issuer, usually the carrier) from altering the contents of the file.

In various embodiments, the policy may be implemented in different formats. One example of a format for the policy is provided below, but the formats should not be limited by this example, as other formats are contemplated.

```
/<X>/Emergency Location policy upon PSAP call back/
The Emergency Location policy leaf indicates whether the UE provides
emergency information or not for emergency call back.
    • Occurrence: One
    • Format: bool
    • Access Types: Get, Replace
    • Values: 0, 1
        0 - UE provides emergency information.
        1 - UE does not provide emergency information.
    <Node>
        <NodeName> Emergency Location policy </NodeName>
        <DFProperties>
            <AccessType>
                <Get/>
                <Replace/>
            </AccessType>
            <DFFormat>
                <bool/>
            </DFFormat>
            <Occurrence>
                <One/>
            </Occurrence>
            <DFTitle> Emergency Location policy </DFTitle>
            <DFType>
                <MIME>text/plain</MIME>
            </DFType>
        </DFProperties>
    </Node>
```

As mentioned previously, when the UE 110 receives the response message 150 that includes the indicator 160, the UE 110 might transmit information 180 about itself to the PSAP 130. If policy allows, one piece of the information 180 that the UE 110 might include in the SIP message 170 is the UE's public user identities (such as Tel URI, SIP URI, or Mobile Station International ISDN Number (MSISDN)) or some other identifying symbol. Including such information could be subject to policy or could be accompanied by an indicator that private information is not shared with the PSAP or emergency centre or untrusted network elements. The public user identities might be in GRUU format or may contain sufficient information that a callback over Circuit Switch technology is possible, e.g., in Tel URI format. The PSAP 130 can use the identifier to make a callback to the UE 110 if necessary, as described below. Another piece of information 180 that the UE 110 might transmit in the acknowledgement message 170 is the type of access that the UE 110 is using. For example, if the emergency call is being made over a wireless local area network (LAN), the UE 110 might include that fact in the information 180, as well as a cell ID, a line ID, and/or a wireless LAN access node ID. During the dialog, the points of attachment to the IP-Connectivity Access Network (IP-CAN) of the UE can change (e.g., UE connects to different cells). The UE can populate the P-Access-Network-Info header in any request or response within a dialog for which transmission of such information is supported (e.g., excluding ACK requests and CANCEL requests and responses), with the current point of attachment to the IP-CAN (e.g., the current cell information).

If the UE 110 is aware of its geographic location, e.g., through the use of a global positioning system (GPS), the UE 110 can include its location as another piece of the information 180, such as but not limited to Cell Global Identity (CGI), Service Set Identifier (SSID), waypoints such as landmarks, and the signal strength of adjacent cells with corresponding CGIs. If the UE 110 is not aware of its geographic location, location-related data is not included in the information 180. If a GRUU (globally routable UA (user agent) URI (uniform resource identifier)) is associated with the UE 110, the UE's GRUU can be included as another piece of the information 180. Depending on the privacy settings of the user, the GRUU may be a P-GRUU or a T-GRUU, although a public GRUU (P-GRUU) is preferred over a temporary GRUU (T-GRUU).

Other items that can be included in the information 180 might include the capabilities of the UE 100, the radio access technology being used by the UE 110, the battery life of the UE 110, the signal strength, and the network identity (e.g., CGI, SSID, SID). The UE 110 could also invoke what is commonly known as ecall functionality to be sent to the PSAP 130.

Before the emergency request reaches the PSAP 130, it might be handled by one or more components in the IMS network 120. Examples of such components are the P-CSCF, E-CSCF, AS, and IBCF (Interconnect Border Control Function). An IMS network component, such as P-CSCF, AS, and E-CSCF, can inspect all requests in order to determine if they are related to emergencies. If a request is determined to relate to an emergency, based on configurations and regulator policies, the network component can determine to reject the request or update the request or include the emergency call indicator 160 in a SIP response that is sent to the UE 110. Updating the request might be done if the UE provides a T-GRUU and the network operator policy settings (e.g., in the P-CSCF) indicate that the public user identities must be provided. In such a case, the T-GRUU can be replaced with the GRUU. In addition, updating of messages to be routed to PSAPs might be done if the message contains P-Preferred-Service header fields, P-Asserted-Service header fields, Accept-Contact header fields containing one or more IMS Communication Service Identifier (ICSI) values (coded as specified in subclause 7.2A.8.2 in 3GPP TS 24.229) or one or more IMS Application Reference Identifier (IARI) values (coded as specified in subclause 7.2A.9.2 in 3GPP TS 24.229) that are related to the request in a g.3gpp.app_ref feature tag. Note that the network element can be in Back to Back User Agent (B2BUA) or proxy role when updating these SIP requests or responses. Note that if the network element is an AS, there is a need for a new reference point between the AS and at least one of IBCF, E-CSCF or P-CSCF as at the moment there is only a service control reference point between AS and S-SCSF or I-CSF. The P-Preferred-Service header fields, P-Asserted-Service header fields should not be forwarded to the PSAP or emergency centre. The Accept-Contact header fields should be groomed for ICSI values and IARI values as they may cause interactions when selecting a SIP user agent terminating the session at the PSAP. If the Accept-Contact header field contains g.3gpp.app_ref media feature tags, they and their values shall be removed. If the Accept-Contact header field contains g.3gpp.app_ref media feature IARII tags, they and their values can be removed.

In other words, what is termed "updating" can include changing the GRUU from a temporary GRUU into a public GRUU. This is done because a temporary GRUU is invalid if the UE is disconnected and has to reregister. A PSAP cannot make a callback to a temporary GRUU after the UE de-registers and re-registers. Public GRUUs, on the other hand, have the property that they are routable even after the UE de-registers and re-registers (making a PSAP callback to that public GRUU more likely to complete). "Updating" can also include not propagating of ICSI or IARI feature tags, P-Preferred-Service header fields, and/or P-Asserted-Service header fields. The presence of such tags or fields might skew the handling of the request at the PSAP and cause the request to be routed based on services supported on the UE rather than, for example, on geographical proximity and type of service requested. Since there is typically not an S-SCSF and not a (MultiMedia Telephony) Application Server in the session path between the UE, the P-CSCF, the E-CSCF, and the PSAP, these services the UE supports are typically not available during the emergency call. So signaling it as part of an emergency request (even when the UE did not realize it is an emergency request and includes ICSI or IARI feature tags, P-Preferred-Service header fields, and/or P-Asserted-Service header fields because it believes the request it makes is a normal request) does not serve any purpose and may only detract/result in routing the requests to other PSAPs or PSAP User Agents than those determined based on location, requested type of service, and RFC 3261 procedures. In a worst case scenario, if a PSAP User Agent registers its support for said services, it may receive a higher load of emergency service requests than other PSAP User Agents, possibly leading to delay in the emergency response.

In the embodiments where a component in the IMS network 120 rejects the emergency service request, it can respond with a SIP 3xx message, such as a 300 (Multiple Choices), 301 (Moved Permanently), 302 (Moved Temporarily), 380 (Alternative Service) message, or a SIP 4xx response or a SIP 6xx response. A SIP 380 (Alternative Service) is preferably used to indicate that the UE should try another access technology such as CS, or use/create another secure context/registration such as the context created by the emergency registration. The message can also be used to inform the UE to not use the present context (which might have been created as a result of an emergency registration).

The following are cases where the network may be configured to reject the request: a) the network is not able to handle emergency sessions; b) the IM CN subsystem to which the P-CSCF belongs is not able to handle emergency sessions; c) due to local policy, the network does not handle emergency sessions; d) the network only handles certain types of emergency session requests; e) the UE is roaming; f) the P-CSCF is in a different network than the UE's home operator's network; g) the network does not support emergency sessions for either the geographical location where the UE is located or the IP-CAN to which the UE is attached.

It should be noted that a 3xx redirection response may be valid or routable in the currently attached network only. For example, urn:service:sos.animal-control may be valid in the address book only for some networks to which the UE 110 can attach/register. Usage of an address in the address book can be conditional to the operator or region to which the UE 110 is attach/registered. A 3xx response urging the UE to use another address for this emergency-related request or a request determined to be not related to an emergency should not be followed by simply changing the corresponding address book entry, if present, in the address book.

Two examples can illustrate cases where the network rejects the request because the type of emergency session request is not supported. In the first example, RFC 5031 defines urn:service:sos.animal-control as follows: Animal control typically enforces laws and ordinances pertaining to animal control and management, investigates cases of animal abuse, educates the community in responsible pet ownership and wildlife care, and provides for the housing and care of homeless animals, among other animal-related services. In some jurisdictions, a request to urn:service:sos.animal-control may not be classified as an emergency in the sense that it is subjected to network and operator emergency procedures (e.g. allow or disallow a request to urn:service:sos.animal-control when the UE didn't register or has insufficient credentials). If so configured, the network could either reject with an indication that the call is not actually an emergency or it could reject with an indication that the call is not an emergency and offer alternative steps to be executed such as offering a different URI to contact and/or a different Circuit Switched (CS) network address such as a digit string. Note that, since emergency service URNs are not routable and are not E.164 numbers, the UE may not be able to proceed lacking knowledge of routable addresses or numbers. In those jurisdictions, it would be inappropriate if the UE executed emergency procedures (as specified in 3GPP TS 24.008) and a UE should not automatically contact, for example, "911" or "112" upon receiving a rejection when contacting, e.g., urn:service:sos.animal-control.

Note that it is possible that a CS-enabled UE has received a list of local CS emergency numbers (e.g. received a result of the Location-Update procedure). A UE could indicate the requested emergency service type in a CS emergency request and be connected to the requested PSAP using procedures in 3GPP TS 24.008. E.g., the following table exists:

TABLE 10.5.135d

| 3GPP TS 24.008: Service Category information element |
| --- |
| Emergency Service Category Value (octet 3) |
| The meaning of the Emergency Category Value is derived from the following settings (Please see 3GPP TS 22.101 clause 8): |
| Bit 1  Police |
| Bit 2  Ambulance |
| Bit 3  Fire Brigade |
| Bit 4  Marine Guard |
| Bit 5  Mountain Rescue |
| Bits 6,7,8 are spare and set to "0" |
| Mobile station may set one or more bits to "1" |
| If more than one bit is set to "1", routing to a combined Emergency centre (e.g. ambulance and fire brigade in Japan) is required. If the MSC can not match the received service category to any of the emergency centres, it shall route the call to an operator defined default emergency centre. |
| If no bit is set to "1", the MSC shall route the Emergency call to an operator defined default emergency centre |

However, at present no mapping for urn:service:sos.animal-control exists. A mapping for some other emergency services as defined in RFC 5031 (e.g. urn:service:sos.police) can be made by setting the corresponding bit in Emergency Category Value (e.g. urn:service:sos.police maps to Bit 1 of the Emergency Service Category Value, urn:service:sos.ambulance maps to Bit 2 of the Emergency Service Category Value, urn:service:sos.fire maps to Bit 3 of the Emergency Service Category Value, urn:service:sos.marine maps to Bit 4 of the Emergency Service Category Value, urn:service:sos.mountain maps to Bit 5 of the Emergency Service Category Value). urn:service:sos.animal-control, urn:service:sos.physician, urn:service:sos.poison, urn:service:sos.gas, and others could map to an Emergency Service Category Value with no bits set "1", causing the call to be routed to an operator-defined default emergency centre. Alternatively, for requests for which no PSAP is supported in the network, the UE could be instructed to make a normal SIP request (using procedures in 3GPP TS 24.228) or setup a normal CS call (using procedures in 3GPP TS 24.008). The network could accomplish such by not indicating an alternative address that cannot be mapped to an Emergency Service Category Value (i.e. not one of the urn:service:sos URNs for which a mapping is standardized). When an emergency request is received by the PSAP but the PSAP cannot handle the request and returns a SIP 380 or a similar message, if a mapping exists on the UE from the given URN to an Emergency Service Category Value, a call shall be setup to that CS PSAP E.164 number automatically.

In the second example: the P-CSCF may determine that the emergency request is made to urn:service:sos.police. However, for example in the Netherlands, contacting the police does not per definition warrant activating emergency procedures. Instead, a special number different from "112" is configured: 0900-8844. Other examples are "19" Police (Albania)", "100" (Police and Fire Brigade (Greek cities)), "100" (Ambulance and Fire Brigade (Belgium)), "112" (Police and Ambulance (Italy)), "112" (General emergency call, all categories (Sweden)), "115" (Fire Brigade (Italy)), "144" (Ambulance (Austria)), "*377" (local police agency or Department of Public Safely office, non-emergency roadside assistance in Texas). Such a number may be a premium service. It could be inappropriate if the UE automatically contacted, for example, "911" or "112" if the network rejects the call to urn:service:sos.police, and it could be inappropriate if the network automatically contacted, for example, 0900-8844 as a regular call as the user, without realizing it, may then automatically receive premium charges. The P-CSCF could provide alternative steps such as providing a digit string, e.g., 0900-8844, in a SIP 3xx response. However, the digit string may be part of a message that identifies that the digit string should be displayed and/or that a textual message should be displayed to indicate the nature of the call that was made and the nature of the number provided.

In one embodiment, the P-CSCF has configurable lists with local and roaming partners' emergency service identifiers which indicate per emergency service identifier the handling. When rejecting the request, a configurable list of alternate emergency service URIs can be included in the response, e.g., signaled as part of the SIP Contact header field. These alternative emergency services can be annotated with alphanumeric information that can be displayed, e.g., when signaled as part of the SIP Contact header field. The alternative emergency services can also be identified, using an XML body with XML elements and XML attributes, as being displayed only if required.

In some cases, the network might reject a request made to a regular emergency center or perhaps a combined PSAP or a combined emergency centre, where a combined PSAP or a combined emergency centre is a PSAP that accepts calls for multiple types of emergencies. For example, a combined PSAP or a combined emergency centre might accept calls for police emergencies, fire emergencies, ambulance emergencies, and other types of emergencies. A request made to a combined emergency centre might include bits, flags or other indicators (such as a PSAP address (e.g., "119" in some countries) or part of an PSAP address) that specify the emergency response entities to which the request should be routed. For example, if a request is made for fire service and ambulance service, the request might include a "fire" flag and an "ambulance" flag. Upon reading these tags, the combined emergency centre can route the request to the appropriate emergency response entities.

In an embodiment, a UE might send a request to an emergency center or perhaps combined emergency centre and the UE is not aware that the request is related to an emergency center and for various reasons the network rejects or otherwise does not process the request. In this case, the network might identify the request as related to a combined emergency centre. The network then sends a message to the UE containing information identifying that the request relates to a combined emergency centre. The UE might then use this information to send the request to a combined emergency centre or combined PSAP or other alternate emergency centre or PSAP. In some embodiments, the alternate PSAP is in the circuit switched domain. The information in the message that the network sends to the UE can include information identifying the combined emergency centre, bits, flags or other indicators that specify the emergency response entities to which the original request was routed. Upon receiving this message, the UE can send an alternate request to the alternate or combined PSAP and can include the bits, flags or other indicators so that the alternate PSAP can route the alternate request to the appropriate emergency response entities. The bits, flags or other indicators may be the bits specified in Table 10.5.135d in 3GPP TS 24.008.

More specifically, a network element such as a P-CSCF verifies if the requests that it receives contain emergency service identifiers. The P-CSCF may determine that a proper emergency call request was made but that the local network does not support the requested emergency PSAP (e.g., a request to urn:service:sos.gas was made). The P-CSCF may also determine that the UE failed to recognize the request as an emergency call request. The P-CSCF can then be configured to reject the request and provide sufficient information for the UE to route the request to an alternate answering point since the UE user is of the impression it is reporting a situation that requires attention. However, a PSAP/emergency centre for that type of emergency is not supported in the network.

Today, in the CS network, Service Categories have been allocated for Police, Ambulance, Fire Brigade, Marine Guard and Mountain Rescue. However, in the event a 380 (Alternative Service) is returned by the P-CSCF, one of the options the UE has is to initiate an emergency call in the CS domain using appropriate access technology specific procedures. However, the UE, upon receiving the 380, still does not know if the original request with the emergency service identifier that was not recognized by the UE was destined for a default PSAP, Police PSAP, Ambulance PSAP, Fire Brigade PSAP, combined PSAP, etc.

In an embodiment, in the event the P-CSCF has been configured to recognize the request as for a particular type of emergency, then the P-CSCF informs the UE that the request was for that type of emergency. In addition, if the P-CSCF rejects the request because the requested emergency type is not supported, the P-CSCF can provide additional information. The UE can be enhanced to handle 380 (Alternative Service) messages for unrecognized emergency requests to particular PSAPs. When attempting to connect to a particular PSAP using the CS Domain, a mapping to the correct Emergency Category Value (see 3GPP TS 24.008, subclause 10.5.4.33) can be made. The P-CSCF can be enhanced to reject emergency service requests to unsupported PSAPs, e.g., urn:service:sos.gas, based on local policy.

The following is an example of an XML body indicating to the UE that an emergency service request was detected and instructing the UE to connect to the determined PSAP.

```
<ims-3gpp version="...">
    <alternative-service>
        <type alternate="
            tel:119;phone-context=+81
            urn:service:sos.fire-urn:service:sos.ambulance">
            <emergency/>
        </type>
        <reason/>
    </alternative-service>
</ims-3gpp>
```

Previous proposals mentioned signaling recognition by the IMS network of a request to a combined emergency centre and mapping from the signaled value representing a combined emergency centre to one or more bits presented in Table 10.5.135d in 3GPP TS 24.008. 3GPP TS 24.008 is GSM/UMTS specification, and GSM/UMTS supports different regular Setup vs. Emergency Set-up (i.e., without dialed digits). In CDMA, from "IS-2000 release A" onwards, there is also a field called GLOBAL_EMERGENCY_CALL that can be included in an Origination message to make such a call independent of a dialed string. The protocol revision level that supports this is 7 and up. Earlier UEs, with a "protocol revision level currently in use is less than 7", do not distinguish between emergency and normal calls. Thus, such UEs might have to map, say, "tel:119; phone-context=+81" to 119 and dial 119 as a normal call.

Also, CDMA does not support routing to Combined Emergency Centres or Specialized Emergency Centres (e.g., for "police" only). 3GPP2 only documents how to route to default PSAPs. Thus, in an alternative embodiment, a CDMA UE detects that the IMS network has determined that the original request to the IMS network was for a non-default PSAP. The CDMA UE might then, rather than sending an emergency call with GLOBAL_EMERGENCY_CALL set to "1" (rather than routing to the default PSAP), support one or more of the following: an emergency call with Global_Emergency set to "1" and in the address field a phone number: say 119, if "the protocol revision level currently in use is NOT less than 7"; an emergency call with Global_Emergency set to "0" and in the address field a phone number: say 119, if "the protocol revision level currently in use is NOT less than 7"; and/or an emergency call with in the address field a phone number: say 119, if "the protocol revision level currently in use is less than 7".

Current proposals add an "alternate attribute" to the existing XML Schema. In an embodiment, the alternate attribute includes a number of alternative addresses, one of which (the last element) could be an indicator encoding the need to route the call to a combined emergency centre by 'dashing' together emergency service URNs: e.g. "Urn:service:sos.ambulance-Urn:service:sos.fire". Alternative embodiments could encode the alternative addresses differently in the SIP response, e.g., in the Contact header fields or in a separate, new XML body. Another alternative could be a different encoding such that the indicator would still be a URN or tel URI or SIP URI. For example, urn:service:sos.fire.ambulance (e.g., 'dotting' together the emergency sub types).

An emergency number might be interpreted in different ways in different countries. For example, the address "119" might translate to policy+marine in one country and fire+ambulance in another. If both countries have operators that are roaming partners with the home network of a roaming user, the UE or the network needs to recognize the address as an emergency request, but the network might not know which 119 translation is intended. In an embodiment, in such a situation, the network selects one of the translations after further interaction with the UE.

Such further interaction includes, for example, the network sending information to the UE indicating that the address is associated with different emergency types in different jurisdictions. Such information includes a mapping between the address, a phone context and one or more optional emergency identifier types and is known as alternate address information. An emergency identifier type is optional where the phone context does not map to an emergency type but non "emergency" or "urgent" alternatives are known.

Alternate address information comprises a mapping between an address, a phone context and one or more optional emergency identifier types. The address indicates the emergency number dialed which could be a telephone number such as '119' for example. The phone context indicates a relevant condition of the UE, such as the location or country the UE is in, and could be a number or a string such as '+81', the textual string 'Japan', a combination of a number and a string or other information that can be resolved to a location, for example. The textual string (e.g. 'Japan') can be received in multiple languages and multiple character encodings, including Japanese and other non ASCII character sets. The emergency identifier type (e.g. 'police', 'fire' or 'ambulance' for example) is extendible and indicates the type of emergency service associated with the address for a given phone context. The country or region where the emergency services apply can be identified using applicable ITU, IANA, ISO codes, however, in some cases certain emergency services are provided in an area not coinciding with a "country" or region, in which case a standard ITU, IANA, ISO code might not have been allocated. Some ITI, IANA, ISO or other codes applicable for encoding locations, countries or regions are extendible, such as ISO 3166-1, and the ISO 3166/MA.

Alternate address information may additionally contain a reason element, such as a <reason> XML element (as described in e.g. 3GPP IMS XML body as defined in 3GPP TS 24.229) for example. A reason element is populated with information that can be presented to a user of a UE to identify, for example, the location, the emergency service types supported and/or the emergency service numbers. Such a reason element could be transmitted in an enhanced application/3gpp-ims+xml body (as defined in 3GPP TS 24.229). The contents of a reason element can be specified in multiple languages, using the xml:lang attribute. For example, a reason element can be represented by the following body (which corresponds to an enhanced XML Schema in 3GPP TS 24.229).

```
<ims-3gpp version="2">
    <alternative-service>
        <type><emergency/></type>
        <reason lang="en">emergency</reason>
        <reason lang="nl">noodgeval</reason>
    </alternative-service>
</ims-3gpp>
```

The network sends such alternate address information to the UE, for example, as part of the body of a SIP 300 (Multiple Choices) response, in one or more Contact field headers of the SIP 300 (Multiple Choices) response or in another SIP 3xx response (e.g. a SIP 380 (Alternative Service) response).

The following is an example of an XML body included in a response to a request for an emergency service indicating to the UE that an address ('119' for example) is associated with a different, or a combination of, emergency types ('fire', 'ambulance' or 'police' for example) in different phone contexts ('+81' for example). Note that the emergency types are derived from RFC 5031's emergency service URN (i.e. urn:service:sos and its subtypes, police, ambulance, gas, fire, etc., where <police/> can map to urn:service:sos.police, etc.) Note that the emergency type <sos/> can map to the generic service URN urn:service:sos.

Note that <sos/> can map to the dial string "112" or to a GSM/UMTS CS domain emergency call setup with all Emergency Service Category Value bits set to '0' (see Table 10.5.135d/3GPP TS 24.008: Service Category information element) such that the call is routed to an operator defined default emergency centre or equivalent signaling in other CS domain technologies such as CDMA. Note that <police/> could also map to setting bit 1 of the Emergency Service Category Value when making a GSM/UMTS emergency call over the CS domain.

```
<ims-3gpp version="...">
  <alternative-service>
    <type>
      <emergency/>
    </type>
    <reason/>
    <action>
      <alternative>
        <alternativeURI>tel:112;phone-context=+57</alternativeURI>
        <sos/>
      </alternative>
      <alternative>
        <alternativeURI>tel:123;phone-context=+57</alternativeURI>
        <ambulance/>
        <fire/>
        <police/>
      </alternative>
      <alternative>
        <alternativeURI>tel:119;phone-context=+81</alternativeURI>
        <alternativeURI>tel:119;phone-context=+82</alternativeURI>
        <alternativeURI>tel:119;phone-context=+886</alternativeURI>
        <ambulance/>
        <fire/>
      </alternative>
      <alternative>
        <alternativeURI>tel:119;phone-context=+94</alternativeURI>
        <alternativeURI>tel:119;phone-context=+1876</alternativeURI>
        <police/>
      </alternative>
      <alternative>
        <alternativeURI>tel:119;phone-context=+57</alternativeURI>
        <alternativeURI>tel:119;phone-context=+86</alternativeURI>
        <fire/>
      </alternative>
      <alternative>
        <alternativeURI>tel:119;phone-context=+62</alternativeURI>
        <alternativeURI>tel:118;phone-context=+62</alternativeURI>
        <ambulance/>
      </alternative>
    </action>
  </alternative-service>
</ims-3gpp>
```

The above exemplary XML body indicates that the address '119' can be translated to a different emergency type in a different jurisdiction. For example, the address '119' is associated with 'fire' and 'ambulance' emergency services when the UE is in a jurisdiction having a phone context of '+81' (Japan) or '+82' (Korea). The address '119' is alternatively associated with 'police' emergency services when the UE is in a jurisdiction having a phone context of '+94' (Sri Lanka).

If a country code or location code is included in an emergency service request which can be mapped to multiple emergency service types, it is assumed that the handset specifically intends for the request to be routed to the emergency service type associated to the emergency service address in the indicated country or region.

In another embodiment, the UE or network are configured to select or reduce the alternatives in the response and to remove some of the less probable possibilities. Such selection or reduction can be achieved based on the current network of a UE, the home network of the UE, the nationality of the user of the UE, or past travel plans of the user of the UE for example. A UE which performs selection or reduction, could include a policy which hard codes a mapping between an address, an emergency type and phone context, thereby enabling the UE to explicitly select the intended emergency type when making an emergency call over the CS domain or PS domain. On the PS domain, an emergency type can be either indicated per a RFC 5031 URN or per a TEL URL including a country or region indicator such as 'phone context'. An emergency type selection function on the UE could be further enhanced if the UE is aware of the country or region it is in and if a locally stored or received mapping of emergency types, location indicators and emergency call addresses is present. The emergency type selection function could then determine that that in certain countries or regions a certain mapping does or does NOT apply, or the mapping applies universally (e.g. for UMTS/GSM handsets the number "112" can map to a GSM/UMTS CS domain emergency call setup with all Emergency Service Category Value bits set to '0' (see Table 10.5.135d/3GPP TS 24.008: Service Category information element)).

Such further interaction between the network and the UE to select a translation also includes, for example, placing choices for the translation in a textual field to be displayed on the UE (such as the <reason> element in the 3GPP IMS XML body). The UE user could then select one of the choices, the selection could be transmitted to the network, and the network could translate the emergency number based on the selection. Alternatively, the network could make the selection in the following order: map the address (e.g., 119) as defined in the home network; if the address is not defined in the home network, map the address as defined in the current visited network, if the address is not defined in the current visited network, map the address as defined for roaming partners or route the call to the default or most capable PSAP. Alternatively, the request can always be routed to the default or most capable PSAP.

A similar problem can occur for the UE when it attempts to recognize the dialed address as an emergency identifier. In an embodiment, the UE is configured with one translation to prevent this problem from occurring. Alternatively, the UE can interact with the user to select a desired translation. Alternatively, the UE can be configured to route the call to the default or most capable PSAP. Alternatively, the UE could route the call based on the network it is attached to and could map the digits according to that network's rules. The UE could also interact with the network and use any advice it gets.

In yet another embodiment, the P-CSCF will not reject the request for an unsupported emergency service type (such as urn:service:sos.poison) but prepare it for forwarding to the user's home network S-CSCF using normal procedures (as opposed to forwarding it to an E-CSCF). The user's home network's S-SCSF should then be configured to handle the unrouteable Request URI value. The IMS network may also be configured to take account of roaming users requesting a session with urn:service:sos.police, such that the service requested by a UE which may be half way around the world, can still be handled in a timely and effective manner. The IMS network could provide an indication in a SIP message to the UE that the call has been determined to not be an emergency call and that its handling will be different. The indication could be a flag and/or alphanumeric information. Possible encodings of this type of indicator are given in this document.

Returning to the case where an IMS network component determines that the UE 110 has initiated an emergency call without recognizing it as such, in some embodiments the IMS network 120 includes the emergency call indicator 160 in a SIP response that is sent to the UE 110. In this case, the indicator 160 is provided during the call setup signaling phase. In other embodiments, the emergency call indicator 160 is included in a message that originates at the PSAP 130. The IMS network 120 then transfers the message from the PSAP 130 to the UE 110.

In other embodiments, if a component in the IMS network 120 includes the emergency call indicator 160 in the SIP response that is sent to the UE 110, the UE 110 can abort the current signaling and initiate regular emergency call setup procedures, which may involve originating a call over a Circuit Switched network, if capable and available, or after initiating emergency registration procedures, or sending a SIP INVITE request containing an indicator indicating that the SIP INVITE request is an emergency-related call request and containing emergency-related information about itself.

Figure 2:
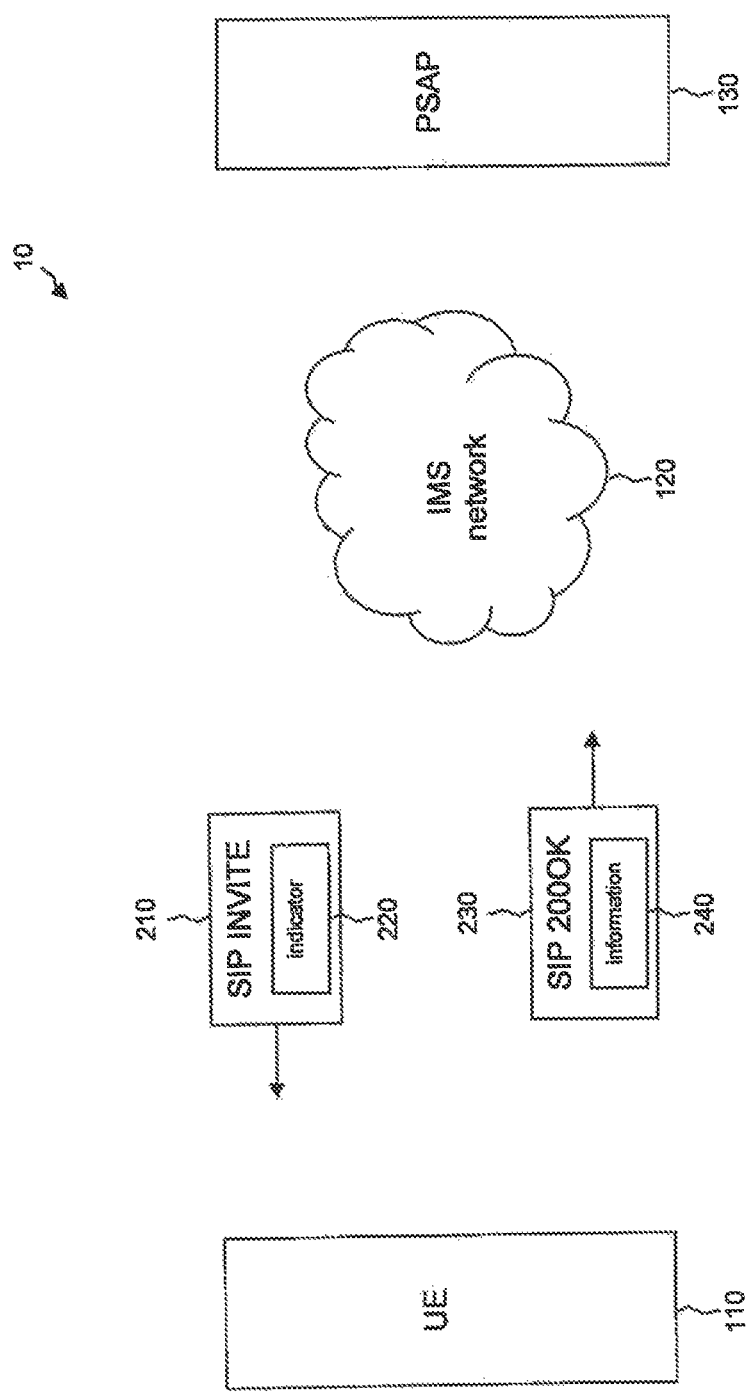
FIG. 2 is a diagram of an illustrative IP network including a UE and a PSAP according to another embodiment of the disclosure.

Information that is similar to the information 180 that the UE 110 includes in the SIP message 170 might be included by the UE 110 in a message sent under different circumstances. This is illustrated in FIG. 2, where the UE 110, the IMS network 120, and the PSAP 130 are again present. However, in this case the PSAP 130 initiates a callback to the UE 110. As is well known in the art, after an emergency call is terminated, the PSAP 130 may place a callback to the UE 110 for various reasons. For example, if the emergency call appears to have terminated abnormally, the PSAP 130 might call the UE 110 back to determine if the UE user wishes to convey any additional information. Alternatively, the PSAP 130 might call the user back to ask for information that was inadvertently not requested in the initial call. Other reasons for a callback from the PSAP 130 to an emergency caller after the termination of an emergency call may be familiar to one of skill in the art.

The PSAP 130 might initiate the callback by sending a SIP INVITE message 210, or a similar message, to the UE 110 via the IMS network 120. In an embodiment, the SIP INVITE message 210 contains an indicator 220 that indicates that the SIP INVITE message 210 is related to an emergency callback. The indicator 220 might be substantially similar to the indicator 160 of FIG. 1 or might be some other type of indicator. The UE 110 can recognize that the indicator 220 is an indication of an emergency callback from the PSAP 130 and can respond to the indicator 220 appropriately by invoking emergency callback functionality, subject to policies. In an embodiment, the response of the UE 110 to receiving the indicator 220 is substantially similar to the response that the UE 110 had upon receiving the indicator 160 of FIG. 1.

For example, one action that the UE 110 might take upon recognizing the indicator 220 is visually or audibly indicating the nature of the session to the user. That is, the UE 110 might alert the user that the incoming call is an emergency callback. The alert might be a message that appears on the display screen of the UE 110 or some other type of indication of the nature of the call. Other actions taken by the UE 110 can involve transmitting a SIP 2xx or 1xx response (e.g. SIP 200(OK) response) 230, or a similar message, that includes information 240 about the UE 110, subject to policies. Alternatively, due to limitations in SIP, the information 240 can be transmitted over several SIP messages or network messages (e.g., UE-provided IP-CAN identity information may not be completely reliable and hence a mechanism based on network provision (e.g., using Policy Control and Charging (PCC)) can provide such information) or within a target refresh request such as a SIP re-INVITE request or an UPDATE request or partially in a SIP PRACK request. The information 240 might be substantially similar to the information 180 that the UE 110 provided upon receiving the indicator 160 of FIG. 1.

One piece of the information 240 that the UE 110 might send to the PSAP 130 is the UE's public user identity or some other identifying symbol. Another piece of information 240 that the UE 110 might transmit in the SIP 200OK message 230 is the type of access that the UE 110 used for the original emergency call. For example, if the emergency call was made over a wireless LAN, the UE 110 might include that fact in the information 240, as well as a cell ID, a line ID, and/or a wireless LAN access node ID.

If the UE 110 is aware of its geographic location, through the use of a GPS system for example, the UE 110 can include its location as another piece of the information 240. If the UE 110 is not aware of its geographic location, location-related data is not included in the information 240. If a GRUU is associated with the UE 110, the UE's GRUU can be included as another piece of the information 240.

In an alternative embodiment, the PSAP 130 might setup a Circuit Switched (CS) call and a CS gateway might then convert the call and the signaling in packet switched technology if the CS call is routed to the CS gateway. Triggered by the incoming call from the PSAP 130, the CS gateway might initiate the callback over packet switched technology by sending a SIP INVITE message 210, or a similar message, to the UE 110 via the IMS network 120.

Figure 3:
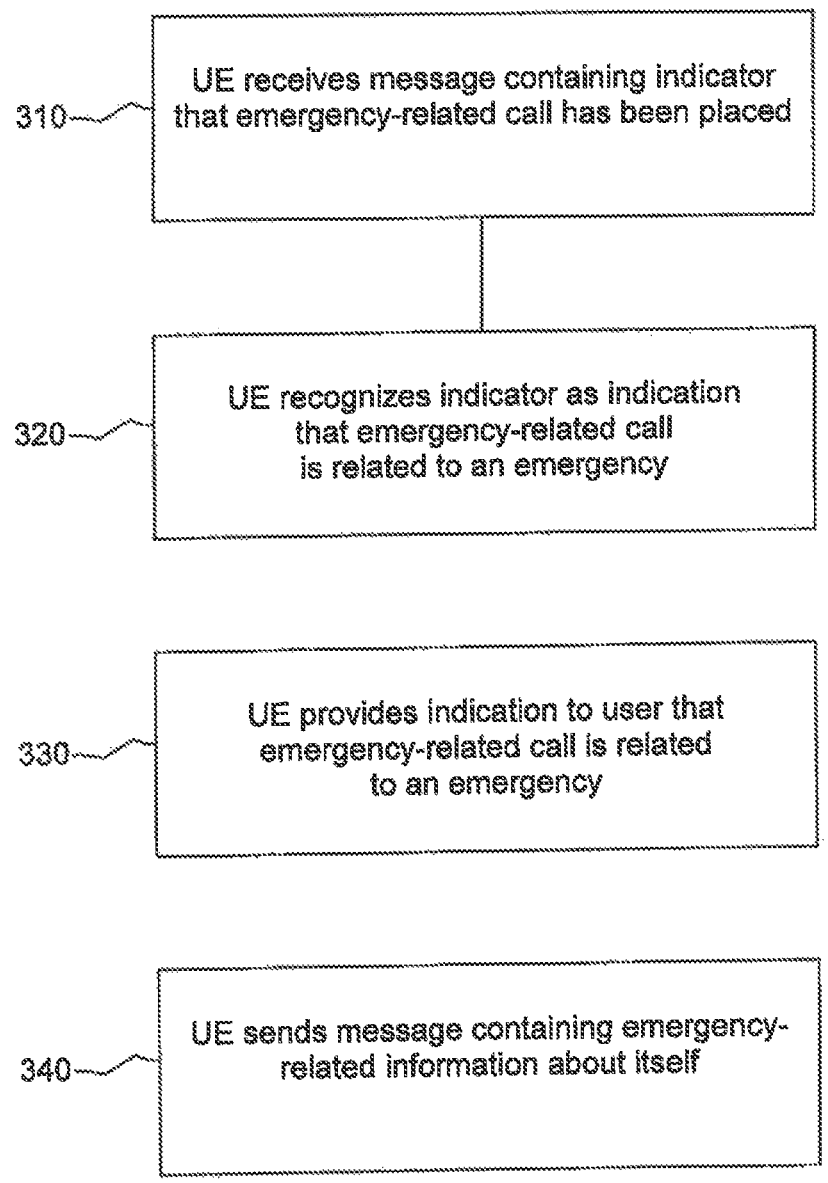
FIG. 3 is a diagram illustrating a method for a UE to respond to an emergency-related message according to an embodiment of the disclosure.

FIG. 3 illustrates an embodiment of a method 300 for a UE to respond to an emergency-related message sent to the UE. In block 310, the UE receives a message containing an indicator indicating that an emergency-related call has been placed. In some cases, the emergency-related call may have been placed by the UE without the UE being aware that the call was related to an emergency. In other cases, the emergency-related call might be a callback from a PSAP to the UE in response to a previous emergency call from the UE. In block 320, the UE recognizes the indicator as an indication that its first message (initial SIP request for a dialog or standalone transaction, or unknown method or similar message) is related to an emergency. Optionally, in block 330, the UE provides a visual, audible, or other indication to the UE user that the emergency-related call is related to an emergency. In block 340, the UE sends a message containing emergency-related information about itself.

The disclosure described herein might be implemented as one or more modifications to the Third Generation Partnership Project (3GPP) Technical Specification (TS) 24.229 "Internet Protocol (IP) Multimedia Call Control Protocol Based on Session Initiation Protocol (SIP) and Session Description Protocol (SDP); Stage 3". Proposed additions and modifications to TS 24.229, according to various embodiments of the present disclosure, are provided below.

The following addition to 3GPP TS 24.229 applies to the initial INVITE request in the UE-originating case of a call initiation:

In the event the UE receives a 380 (Alternative Service) response to an INVITE request the response containing a XML body that includes an <alternative service> element with the <type> child element's "alternate" attribute containing one or more emergency service URIs, the UE can attempt a normal call as described in subclause 5.1.3.1 using a emergency service URI or using call setup according to the procedures described in 3GPP TS 24.008 [8]. The behavior of the UE is implementation specific if the <type> child element's "alternate" attribute is absent or contains no emergency service URIs.

The following modification to 3GPP TS 24.229 applies to general emergency service:
The P-CSCF shall store a configurable list of local emergency service identifiers, i.e. emergency numbers and the emergency service URN, which are valid for the operator to which the P-CSCF belongs to. In addition to that, the P-CSCF shall store a configurable list of roaming partners' emergency service identifiers. The configurable lists with local and roaming partners' emergency service identifiers shall indicate per emergency service identifier the handling. When the handling indicated that the request shall be rejected, a configurable list of alternate emergency service URIs may be included in the response.

The following addition to 3GPP TS 24.229 applies to the general treatment for all dialogs and standalone transactions excluding the REGISTER method after emergency registration:
If the P-CSCF detects that the Request-URI of the initial request for a dialog, or a standalone transaction, or an unknown method matches an unsupported type of emergency in the VPLMN or HPLMN's emergency service identifiers, the P-CSCF shall:
  shall respond to the INVITE request with a 380 (Alternative Service) response;
  shall assume that the UE supports version 1 of the XML Schema for the IM CN subsystem XML, body if support for the 3GPP IMS XML body in the Accept header is not indicated; and
  shall include in the 380 (Alternative Service) response:
    a Content-Type header field with the value set to associated MIME type of the 3GPP IMS XML body as described in subclause 7.6.1.
    The body shall contain:
    a) an <alternative-service> element, set to the parameters of the alternative service;
    b) if the Accept header indicates support for version 2 of the XML Schema for the IM CN subsystem XML body
      then, a <type> child element with an "alternate" attribute set to a list of alternate emergency service URIs,
      otherwise, a <type> child element, set to "emergency";
    c) a <reason> child element, set to an operator configurable reason.

The following, alternative addition to 3GPP TS 24.229 applies to the general treatment for all dialogs and standalone transactions excluding the REGISTER method after emergency registration:
If the P-CSCF detects that the Request-URI of the initial request for a dialog, or a standalone transaction, or an unknown method matches an unsupported type of emergency in the VPLMN or HPLMN's emergency service identifiers, the P-CSCF shall:
  shall respond to the INVITE request with a 380 (Alternative Service) response;
  shall assume that the UE supports version 1 of the XML Schema for the IM CN subsystem XML, body if support for the 3GPP IMS XML body in the Accept header is not indicated; and
  shall include in the 380 (Alternative Service) response:
    a Content-Type header field with the value set to associated MIME type of the 3GPP IMS XML body as described in subclause 7.6.1.
    The body shall contain:
    a) an <alternative-service> element, set to the parameters of the alternative service;
    b) a <type> child element with an "alternate" attribute set to a list of alternate emergency service URIs,
    c) a <reason> child element, set to an operator configurable reason.

The following modification to 3GPP TS 24.229 applies to the general treatment for all dialogs and standalone transactions excluding the REGISTER method for a non-emergency registration:
If the P-CSCF receives an initial request for a dialog, or a standalone transaction, or an unknown method, for a registered user the P-CSCF shall inspect the Request URI independent of values of possible entries in the received Route headers for known emergency service identifiers, i.e. emergency numbers and the emergency service URN from these configurable lists. If the P-CSCF detects that the Request-URI of the initial request for a dialog, or a standalone transaction, or an unknown method matches one of the emergency service identifiers in any of these lists, the P-CSCF shall:
  0) determine the geographical location of the UE. Access technology specific procedures are described in each access technology specific annex. If the P-CSCF is not capable to handle emergency sessions or due to local policy does not handle emergency sessions or only handles certain type of emergency session request or the IP-CAN to which the UE is attached or the UE is roaming or the P-CSCF is in a different network than the UE's home operator's network, then the P-CSCF:
    shall reject the request by returning a 380 (Alternative Service) response to the UE;
    shall assume that the UE supports version 1 of the XML Schema for the IM CN subsystem XML, body if support for the 3GPP IMS XML body in the Accept header is not indicated; and
    shall include in the 380 (Alternative Service) response:
      a Content-Type header field with the value set to associated MIME type of the 3GPP IMS XML body as described in subclause 7.6.1.
    The body shall contain:
    a) an <alternative-service> element, set to the parameters of the alternative service;
    b) if the Accept header indicates support for version 2 of the XML Schema for the IM CN subsystem XML body
      then, a <type> child element with an "alternate" attribute set to a list of alternate emergency service URIs, and
        if the initial request for a dialog, or standalone transaction, or unknown method was for a supported type of emergency, the <type> child element is set to "emergency" to indicate that it was a supported emergency call,
      otherwise, a <type> child element, set to "emergency";
    c) a <reason> child element, set to an operator configurable reason; and
    d) an <action> child element, set to "emergency-registration" if the request included an emergency service URN in the Request-URI.

NOTE 1: Roaming is when a UE is in a geographic area that is outside the serving geographic area of the home IM CN subsystem.

NOTE 1a: "sip:911@example.com;user=phone" could be an alternate emergency service URI.

"urn:service:sos animal-control" could be an unsupported type of emergency call.

NOTE 2: Emergency service URN in the request-URI indicates for the network that the emergency call attempt is recognized by the UE.

The following alternative modification to 3GPP TS 24.229 applies to the general treatment for all dialogs and standalone transactions excluding the REGISTER method for a non-emergency registration:

If the P-CSCF receives an initial request for a dialog, or a standalone transaction, or an unknown method, for a registered user the P-CSCF shall inspect the Request URI independent of values of possible entries in the received Route headers for known emergency service identifiers, i.e. emergency numbers and the emergency service URN from these configurable lists. If the P-CSCF detects that the Request-URI of the initial request for a dialog, or a standalone transaction, or an unknown method matches one of the emergency service identifiers in any of these lists, the P-CSCF shall:

0) determine the geographical location of the UE. Access technology specific procedures are described in each access technology specific annex. If the P-CSCF is not capable to handle emergency sessions or due to local policy does not handle emergency sessions or only handles certain type of emergency session request or the IP-CAN to which the UE is attached or the UE is roaming or the P-CSCF is in a different network than the UE's home operator's network, then the P-CSCF:

shall reject the request by returning a 380 (Alternative Service) response to the UE;

shall assume that the UE supports version 1 of the XML Schema for the IM CN subsystem XML body if support for the 3GPP IMS XML body in the Accept header is not indicated; and shall include in the 380 (Alternative Service) response:
a Content-Type header field with the value set to associated MIME type of the 3GPP IMS XML body as described in subclause 7.6.1.

The body shall contain:
a) an <alternative-service> element, set to the parameters of the alternative service;
b) a <type> child element with an "alternate" attribute set to a list of alternate emergency service URIs, and
if the initial request for a dialog, or standalone transaction, or unknown method was for a supported type of emergency, the <type> child element is set to "emergency" to indicate that it was a supported emergency call;
c) a <reason> child element, set to an operator configurable reason; and
d) an <action> child element, set to "emergency-registration" if the request included an emergency service URN in the Request-URI.

NOTE 1: Roaming is when a UE is in a geographic area that is outside the serving geographic area of the home IM CN subsystem.

NOTE 2: Emergency service URN in the request-URI indicates for the network that the emergency call attempt is recognized by the UE.

The following modification to 3GPP TS 24.229 applies to abnormal cases:

If the IM CN subsystem to where the P-CSCF belongs to is not capable to handle emergency sessions or due to local policy does not handle emergency sessions or only handles certain type of emergency session request or does not support emergency sessions for either the geographical location of the UE is located or the IP-CAN to which the UE is attached, the P-CSCF shall not forward the INVITE request. The P-CSCF:

shall respond to the INVITE request with a 380 (Alternative Service) response;

shall assume that the UE supports version 1 of the XML Schema for the IM CN subsystem XML, body if support for the 3GPP IMS XML body in the Accept header is not indicated; and shall include in the 380 (Alternative Service) response:
a Content-Type header field with the value set to associated MIME type of the 3GPP IMS XML body as described in subclause 7.6.1.

The body shall contain:
a) an <alternative-service> element, set to the parameters of the alternative service;
b) if the Accept header indicates support for version 2 of the XML Schema for the IM CN subsystem XML body
then, a <type> child element with an "alternate" attribute set to a list of alternate emergency service URIs, and
if the initial request for a dialog, or standalone transaction, or unknown method was for a supported type of emergency, the <type> child element is set to "emergency" to indicate that it was a supported emergency call,
otherwise, a <type> child element, set to "emergency";
c) a <reason> child element, set to an operator configurable reason; and
d) an <action> child element, set to "emergency-registration" if the request included an emergency service URN in the Request-URI.

NOTE 1: Emergency service URN in the request-URI indicates for the network that the emergency call attempt is recognized by the UE.

NOTE 1a: "sip:911@example.com;user=phone" could be an alternate emergency service URI.

"urn:service:sos animal-control" could be an unsupported type of emergency call.

NOTE 2: Some networks only allow session requests with a Request-URI containing an emergency service URN, i.e. a service URN with a top-level service type of "sos" as specified in draft-ietf-ecrit-service-urn [69].

The following alternative modification to 3GPP TS 24.229 applies to abnormal cases:

If the IM CN subsystem to where the P-CSCF belongs to is not capable to handle emergency sessions or due to local policy does not handle emergency sessions or only handles certain type of emergency session request or does not support emergency sessions for either the geographical location of the UE is located or the IP-CAN to which the UE is attached, the P-CSCF shall not forward the INVITE request. The P-CSCF:

shall respond to the INVITE request with a 380 (Alternative Service) response;

shall assume that the UE supports version 1 of the XML Schema for the IM CN subsystem XML body if support for the 3GPP IMS XML body in the Accept header is not indicated; and shall include in the 380 (Alternative Service) response:
- a Content-Type header field with the value set to associated MIME type of the 3GPP IMS XML body as described in subclause 7.6.1.

The body shall contain:
- a) an <alternative-service> element, set to the parameters of the alternative service;
- b) a <type> child element with an "alternate" attribute set to a list of alternate emergency service URIs, and if the initial request for a dialog, or standalone transaction, or unknown method was for a supported type of emergency, the <type> child element is set to "emergency" to indicate that it was a supported emergency call;
- c) a <reason> child element, set to an operator configurable reason; and
- d) an <action> child element, set to "emergency-registration" if the request included an emergency service URN in the Request-URI.

NOTE 1: Emergency service URN in the request-URI indicates for the network that the emergency call attempt is recognized by the UE.

NOTE 2: Some networks only allow session requests with a Request-URI containing an emergency service URN, i.e. a service URN with a top-level service type of "sos" as specified in draft-ietf-ecrit-service-urn [69].

The following modification might be made to the 3GPP IM CN subsystem XML body XML Schema to implement one or more of the embodiments disclosed herein:

```
<xs:complexType name="tType">
    <xs:sequence>
        <xs:element name="emergency" minOccurs="0"
        maxOccurs="1">
            <xs:complexType/>
        </xs:element>
        <xs:any namespace="##any" processContents="lax"
        minOccurs="0" maxOccurs="unbounded"/>
    </xs:sequence>
    <xs:attribute name="alternate" type="anyURIlist"/>
    <xs:anyAttribute/>
</xs:complexType>
```

The <action> element contains the "alternate" attribute and only the value "emergency-registration" in the present document. The "alternate" attribute can be set to a list of alternate emergency service URIs.

The following two additions to 3GPP TS 24.229 apply to generic procedures applicable to all methods excluding the REGISTER method:

Upon generating an initial request for a dialog, or a standalone transaction, or an unknown method, excluding ACK and CANCEL, the UE shall include the Accept header with "application/sdp", the MIME type associated with the 3GPP IMS XML body (see subclause 7.6.1) and any other MIME type the UE is willing and capable to accept. In the event the UE receives a 380 (Alternative Service) response to an initial request for a dialog, or a standalone transaction, or an unknown method, the response including an IM CN subsystem XML body as described in subclause 7.6 that includes an <alternative service> element with the <type> child element set to "emergency", the UE shall attempt an emergency call as described in subclause 5.1.6.

If 1xx or 2xx response to an initial request for a dialog, or a standalone transaction, or an unknown method, contains an emergency session indicator, then the UE shall send a re-INVITE request method according to RFC 3261 [26], and:

1) the UE shall indicate the nature of the session to the user;

NOTE 17 the UE does not change the From header to include a public user identity or the tel URI associated with the public user identity, in this version of the specification.

2) if available to the UE, and if defined for the access type as specified in subclause 7.2A.4, the UE shall include a P-Access-Network-Info header and it shall contain a location identifier such as the cell id, line id or the identity of the I-WLAN access node;

NOTE 18: The IMS emergency specification in 3GPP TS 23.167 [4B] describes several methods how the UE can get its location information from the access network or from a server. Such methods are not in the scope of this specification.

3) the UE shall insert a P-Preferred-Identity that includes the public user identity or the tel URI associated with the public user identity as described in subclause 4.2;

4) if the UE has its location information available, then the UE shall include it in the following way:
- if the UE is aware of the URI that points to where the UE's location is stored, include the URI in the Geolocation header in accordance with draft-ietf-sip-location-conveyance [89]; or
- if the geographical location information of the UE is available to the UE, include its geographical location information as PIDF location object in accordance with RFC 4119 [90] and include the location object in a message body with the content type application/piDf+xml in accordance with draft-ietf-sip-location-conveyance [89]. The Geolocation header is set to a Content ID in accordance with draft-ietf-sip-location-conveyance [89]; and 5) if the UE has no geographical location information available, the UE shall not include any geographical location information as specified in draft-ietf-sip-location-conveyance [89]; and 6) if a public GRUU value (pub-gruu) has been saved associated with the public user identity and the UE does not indicate privacy of the P-Asserted-Identity, then the UE shall insert the public GRUU (pub-gruu) value in the Contact header as specified in draft-ietf-sip-gruu [93]; otherwise the UE shall include the protected server port in the address in the Contact header.

NOTE 19 according to RFC 3261 [26], a reINVITE request can not be sent while another INVITE transaction is in progress in either direction.

NOTE 20 it is not necessary for this reINVITE request to change the session parameters.

NOTE 21: It is suggested that UE's only use the option of providing a URI when the domain part belongs to the current P-CSCF or S-CSCF provider. This is an issue on which the network operator needs to provide guidance to the end user. A URI that is only resolvable to the UE which is making the emergency call is not desirable.

NOTE 22: During the dialog, the points of attachment to the IP-CAN of the UE can change (e.g. UE connects to different cells). The UE will populate the P-Access-Network-Info header in any request (except ACK requests and CANCEL requests) or response (except CANCEL responses) within a dialog with the current point of attachment to the IP-CAN (e.g. the current cell information).

Applying privacy, including removing location and access network information, if the PSAP is within the network's trust domain, can be performed by IMS network elements such as E-CSCF, IBCF or others. It may be preferred that "session" privacy is requested (i.e. Privacy header field set to include the value "session" since P-Access-Network-Info header field is present in most SIP messages). It may be preferred that the E-CSCF receives location such that it can determine the most applicable PSAP and use it in routing the request to the PSAP or emergency response centre. Privacy requirements according to RFC 4244 may also apply but at present no procedures foresee including history information in an emergency services request. The following two additions to 3GPP TS 24.229 apply to Procedures at the E-CSCF:

When the E-CSCF receives a request for a dialog requesting privacy or standalone transaction requesting privacy or any request or response related to a UE-originated dialog requesting privacy or standalone transaction requesting privacy, and if local operator policy allows user request for suppression of public user identifiers and location information, the E-CSCF shall:

apply any privacy required by RFC 3323 [33] relating to privacy and RFC 3325 [34] to the P-Asserted-Identity header;

if present, remove the P-ACCESS-NETWORK-INFO header field;

if present, remove the location object from the message's body and remove the content type application/pidf+xml from the Content-Type header field;

if present, remove the Geolocation header field.

NOTE: Operator policies (e.g. requirements for support of emergency communications) may over-ride the user request for suppression.

6) select, based on location information and optionally type of emergency service:
  a PSAP connected to the IM CN subsystem network and add the PSAP URI to the topmost Route header; or NOTE 3: If the user did not request privacy, the E-CSCF conveys the P-Access-Network-Info header containing the location identifier, if defined for the access type as specified in subclause 7.2A.4, to the PSAP.
  a PSAP in the PSTN, add the BGCF URI to the topmost Route header and add a PSAP URI in tel URI format to the Request-URI with an entry used in the PSTN/CS domain to address the PSAP;

NOTE 4: If the user did not request privacy, the E-CSCF conveys the P-Access-Network-Info header containing the location identifier, if defined for the access type as specified in subclause 7.2A.4, towards the MGCF. The MGCF can translate the location information if included in INVITE (i.e. both the geographical location information in PIDF-LO and the location identifier in the P-Access-Network-Info header) into ISUP signalling, see 3GPP TS 29.163 [11B].

NOTE 5: The E-CSCF can request location information and routeing information from the LRF. The E-CSCF can for example send the location identifier to LRF and LRF maps the location identifier into the corresponding geographical location information that LRF sends to E-CSCF. The LRF can invoke an RDF to convert the location information into a proper PSAP/EC URI. Both the location information and the PSAP URI are returned to the E-CSCF.

NOTE 6: The way the E-CSCF determines the next hop address when the PSAP address is a tel URI is implementation dependent.

7) If the user did not request privacy and if the E-CSCF receives a reference number from the LRF the E-CSCF shall include the reference number in the P-Asserted-Identity header;

NOTE 7: The reference number is used in the communication between the PSAP and LRF.

Figure 4:
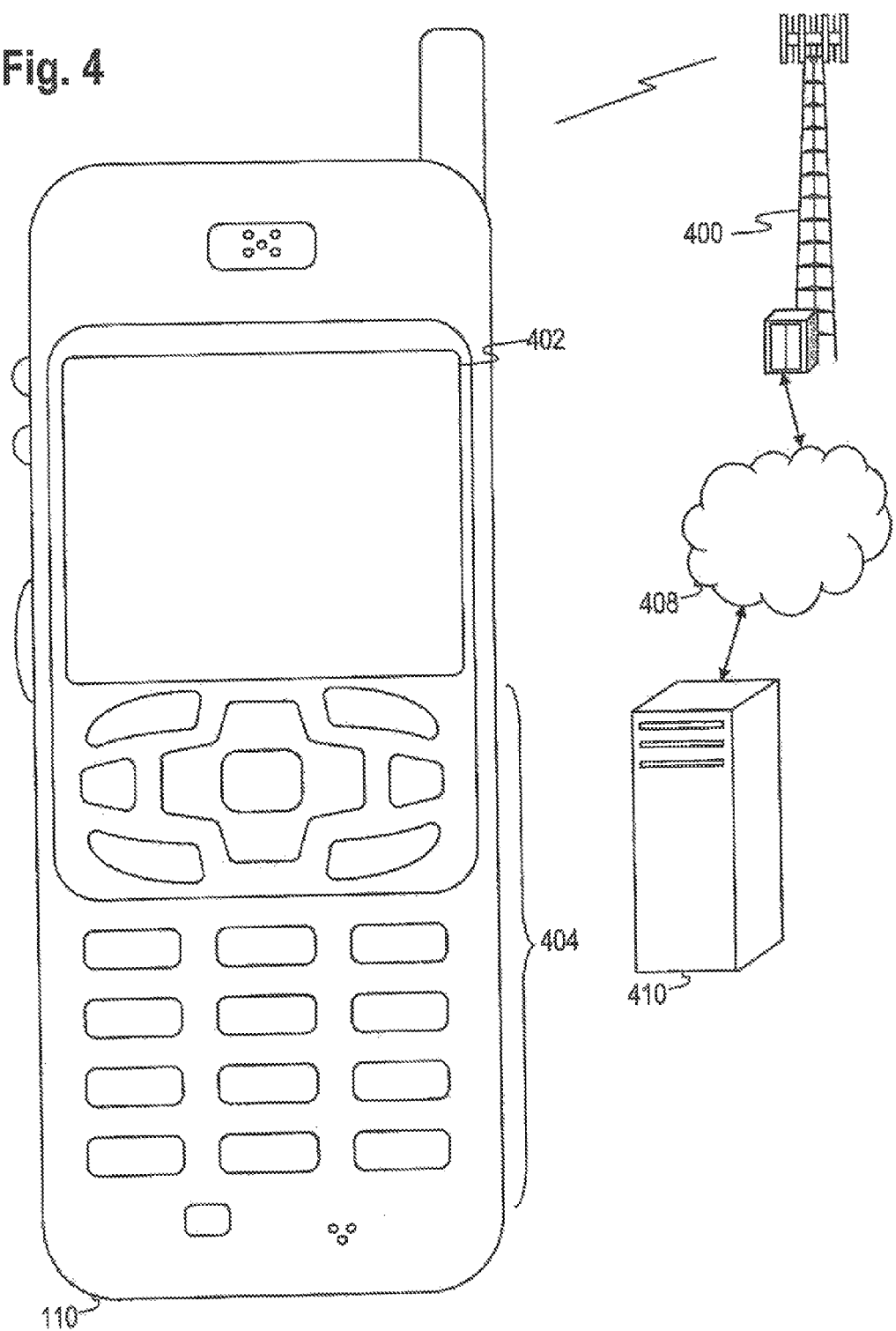
FIG. 4 is a diagram of a wireless communications system including user equipment operable for some of the various embodiments of the disclosure.

FIG. 4 illustrates a wireless communications system including an embodiment of the UE 110. The UE 110 is operable for implementing aspects of the disclosure, but the disclosure should not be limited to these implementations. Though illustrated as a mobile phone, the UE 110 may take various forms including a wireless handset, a pager, a personal digital assistant (PDA), a portable computer, a tablet computer, or a laptop computer. Many suitable devices combine some or all of these functions. In some embodiments of the disclosure, the UE 110 is not a general purpose computing device like a portable, laptop or tablet computer, but rather is a special-purpose communications device such as a mobile phone, wireless handset, pager, or PDA. In another embodiment, the UE 110 may be a portable, laptop or other computing device. The UE 110 may support specialized activities such as gaming, inventory control, job control, and/or task management functions, and so on.

The UE 110 includes a display 402. The UE 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 110 may present options for the user to select, controls for the user to actuate, and/or cursors or other indicators for the user to direct. The UE 110 may further accept data entry from the user, including numbers to dial or various parameter values for configuring the operation of the UE 110. The UE 110 may further execute one or more software or firmware applications in response to user commands. These applications may configure the UE 110 to perform various customized functions in response to user interaction. Additionally, the UE 110 may be programmed and/or configured over-the-air, for example from a wireless base station, a wireless access point, or a peer UE 110.

Among the various applications executable by the UE 110 are a web browser, which enables the display 402 to show a web page. The web page may be obtained via wireless communications with a wireless network access node, a cell tower, a peer UE 110, or any other wireless communication network or system 400. The network 400 is coupled to a wired network 408, such as the Internet. Via the wireless link and the wired network, the UE 110 has access to information on various servers, such as a server 410. The server 410 may provide content that may be shown on the display 402. Alternately, the UE 110 may access the network 400 through a peer UE 110 acting as an intermediary, in a relay type or hop type of connection.

FIG. 5 shows a block diagram of the UE 110. While a variety of known components of UEs 110 are depicted, in an embodiment a subset of the listed components and/or additional components not listed may be included in the UE 110. The UE 110 includes a digital signal processor (DSP) 502 and a memory 504. As shown, the UE 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 110 to send and receive information from a cellular network or some other available wireless communications network or from a peer UE 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 110 and may also enable the UE 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 110 to communicate wirelessly with other nearby UEs and/or wireless base stations.

The input/output interface 518 may further connect the DSP 502 to the alert 526 that, when triggered, causes the UE 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 110 to determine its position. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the node hardware with standardized interfaces that are accessible to application software. The operating system drivers 604 include application management services ("AMS") 606 that transfer control between applications running on the UE 110. Also shown in FIG. 6 are a web browser application 608, a media player application 610, and Java applets 612. The web browser application 608 configures the UE 110 to operate as a web browser, allowing a user to enter information into forms and select links to retrieve and view web pages. The media player application 610 configures the UE 110 to retrieve and play audio or audiovisual media. The Java applets 612 configure the UE 110 to provide games, utilities, and other functionality. A component 614 might provide functionality described herein.

Figure 7:
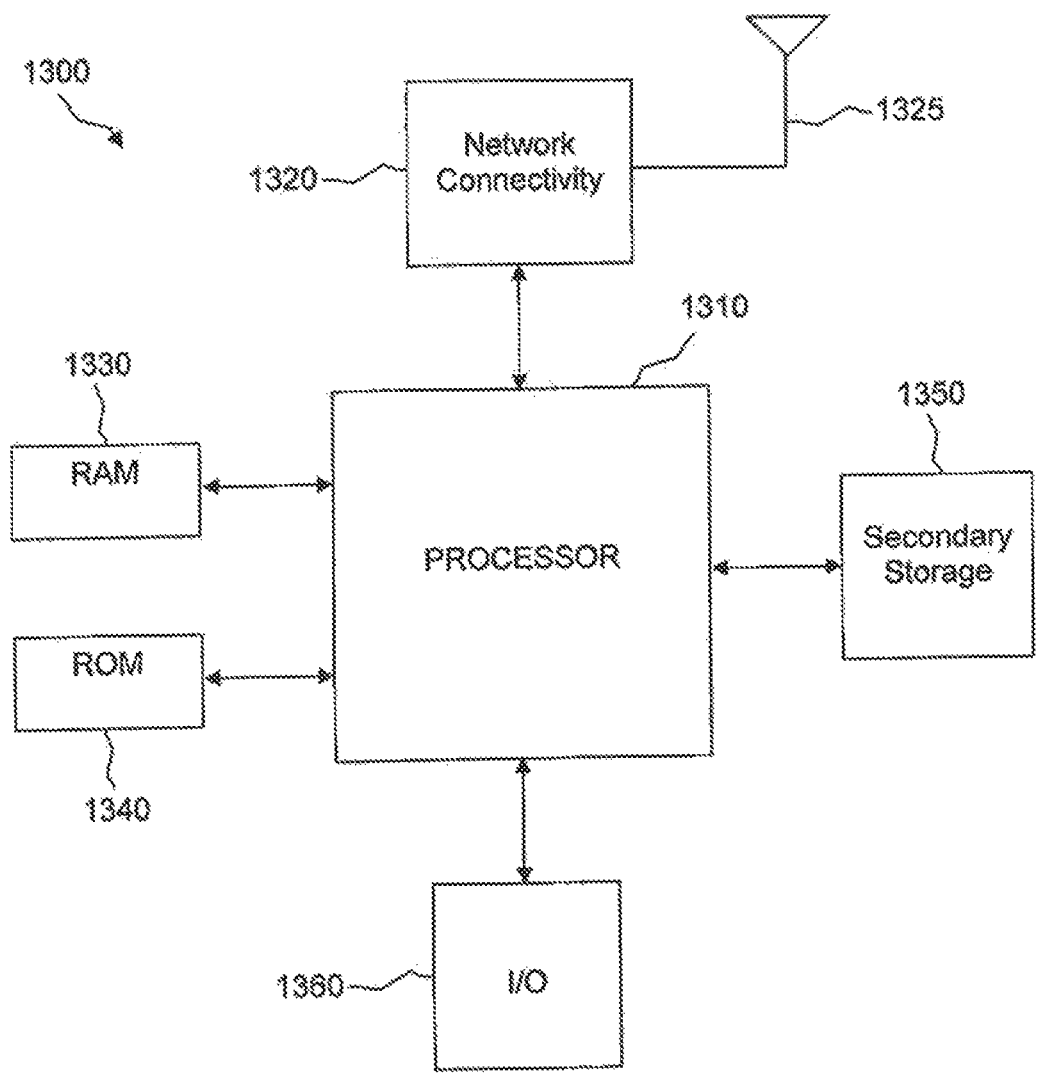
FIG. 7 is an illustrative computing system suitable for some of the various embodiments of the disclosure.

The UE 110 and other components described above might include a processing component that is capable of executing instructions related to the actions described above. FIG. 7 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) and/or global system for mobile communications (GSM) radio transceiver devices, and other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UE 110, such as the display 402 and the input 404.

In an embodiment, a method for a network component to handle requests sent to the network component is provided. The network component inspects requests sent to the network component to determine if the requests are related to emergencies, and if one of the requests is determined to relate to an emergency, the network component updates the request.

When the request is determined to relate to an emergency, the network component is alternatively configured, based on configurations and regulator policies, to perform one of: accepting the request; accepting the request and including an emergency call indicator in a Session Initiation Protocol (SIP) response sent to a user equipment (UE) that initiated the request; not accepting the request by rejecting the request; not accepting the request and indicating alternative contact information for an emergency response center to which the request was directed.

In an embodiment, a SIP (Session Initiated Protocol) response is sent to the UE in response to the UE making a call that the UE is unaware is an emergency call.

If a globally routable user agent uniform resource identifier (GRUU) is associated with the UE, and if the GRUU is a temporary GRUU, the temporary GRUU is replaced with a non-temporary GRUU. The temporary GRUU might be replaced with the non-temporary GRUU only when a request is not made to keep the GRUU private.

If an IMS Communication Service Identifier (ICSI) or an IMS Application Reference Identifier (IARI) is present, before the Request is routed to a PSAP or emergency centre, the network component performs at least one of: removing P-Preferred-Service header fields; removing P-Asserted-Service header fields; removing ICSI feature tags and tag values from the Accept-Contact header fields; and removing IARI feature tags and tag values from the Accept-Contact header fields.

When the network component does not accept the request, the network component responds with one of a 300 (Multiple Choices) message, a 301 (Moved Permanently) message, a 302 (Moved Temporarily) message, a SIP 4xx response, a SIP 6xx response, a SIP 380 (Alternative Service) response.

In an embodiment, the network component does not accept the request due to at least one of: the network not being able to handle emergency sessions; an internet multimedia core network subsystem to which the network component belongs not being able to handle emergency sessions; the network not handling emergency sessions due to local policy; the network only handling certain types of emergency session requests; the UE roaming; the network component being in a different network than the UE's home operator's network; and the network not supporting emergency sessions for one of the geographical location where the UE is located and the Internet Protocol Connectivity Access Network to which the UE is attached.

In an embodiment, the network component includes a configurable list with local and roaming partners' emergency service identifiers that indicate on a per emergency service identifier basis the handling of requests. When the network component does not accept the request, a configurable list of alternate emergency service identifiers is sent to the UE. The at least one alternative emergency service URI might be presented to the user of the UE.

In an embodiment, the network component, rather than not accepting the request for an unsupported emergency service type, prepares the request for forwarding to the UE's home network. The UE's home network might be configured to handle the URI value associated with the request.

In an embodiment, the network component is a proxy call session control function (P-CSCF).

In an embodiment, the requests comprise initial SIP requests for a dialog, standalone SIP transactions, unknown SIP methods.

In an alternative embodiment, a user equipment is provided. The user equipment comprises a component, such that responsive to making an emergency request that is rejected, the component is configured to receive a message containing information associating the emergency request with a combined emergency centre. The component may be further configured to use the information to make a subsequent emergency request to the combined emergency centre.

In an alternative embodiment, a network component is provided. The network component comprises a component, such that upon receiving an emergency request from a user equipment, the component is configured to determine whether the emergency request is related to a combined emergency centre and to send the user equipment a message containing information identifying that the emergency request is related to a combined emergency centre.

In an alternative embodiment, a user equipment is provided. The user equipment comprises a component configured to receive a reject message containing alternate address information associating an emergency request with a plurality of emergency centres, non-emergency centres, or combined emergency centres. The alternate address information can be used to determine to which one of the plurality of centres an emergency call should be routed.

In an alternative embodiment, a network component is provided. The network component comprises a component configured to determine whether a received request is an emergency request and whether the received request is related to one or more specific emergency centres, combined emergency centres, or non-emergency centres and to send a rejection response containing alternate address information. The alternate address information can comprise a mapping between the received request, a phone context and one or more optional emergency identifier types.

The following 3rd Generation Partnership Project (3GPP) Technical Specifications (TS) are incorporated herein by reference: TS 24.229 V7.8.0 (2007-12) and TS 24.008.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An network component, comprising:
a receiver configured to receive from a user equipment ("UE") a Session Initiation Protocol ("SIP") request message for a dialog that is an emergency-related request;
one or more processors configured to update header information of the SIP request message for a dialog;
an interface configured to forward the SIP request message for a dialog toward a Public Safety Answering Point ("PSAP"); and
a transmitter configured to send to the UE a SIP response message in response to the SIP request message, the SIP response message containing a P-Asserted-Identity header field indicating that the network component is part of a trust domain, the P-Asserted-Identity header field including an indicator indicating that the SIP request message for a dialog, sent by the UE, is an emergency-related request, and that the UE should include emergency-related information associated with the UE in a SIP request message within the dialog in response to the SIP response message, the emergency-related information comprising location information;
wherein the indicator comprises a number.

2. The network component of claim 1, wherein the emergency-related information associated with the UE contained in the SIP request message within the dialog comprises a UE identity.

3. The network component of claim 1, wherein the emergency-related information associated with the UE contained in the SIP request message within the dialog comprises a UE location.

4. The network component of claim 1, wherein the emergency-related information associated with the UE contained in the SIP request message within the dialog comprises UE access network information.

5. The network component of claim 1, wherein the network component is an E-CSCF (emergency call session control function).

6. The network component of claim 1, wherein the SIP response message is one of a SIP 1xx or 200 (OK) response.

7. The network component of claim 1, wherein the SIP request message within the dialog is one of:
a SIP ACK;
a SIP PRACK;
a SIP target refresh;
a SIP UPDATE; or
a SIP RE-INVITE request.

8. The network component of claim 7, wherein the SIP request message is a SIP INVITE request.

9. The network component of claim 2, wherein the UE identity is a globally routable user agent uniform resource identifier (GRUU).

10. The network component of claim 3, wherein a geolocation header field of the SIP request message within the dialog includes a URI (Uniform Resource Identifier) that points to the UE location.

11. The network component of claim 1, wherein a message body of the SIP request message within the dialog includes geographical location information of the UE as a PIDF location object.

12. The network component of claim 1, wherein a contact header field of the SIP request message within the dialog includes a public GRUU value associated with a public user identity.

13. The network component of claim 4, wherein the UE access network information is included in a P-Access-Network-lnfo header field in the SIP request message within the dialog and comprises one of a location identifier, a cell identifier or an identity of an WLAN access node.

14. The network component of claim 1, wherein the emergency-related information associated with the UE is not contained in the SIP request message for a dialog.

15. The network component of claim 1, wherein the indicator indicating that a SIP request message for a dialog is an emergency-related request comprises a Uniform Resource Name ("URN").

16. The network component of claim 1, wherein the indicator indicates a PSAP function.

17. The network component of claim 1, wherein the indicator indicates 911.

18. A method for a network component to manage emergency-related information, comprising:
receiving from a user equipment ("UE") a Session Initiation Protocol ("SIP") request message for a dialog that is an emergency-related request;
updating header information of the SIP request message for a dialog;
forwarding the SIP request message for a dialog toward a Public Safety Answering Point ("PSAP"); and
sending from the network component to the UE a SIP response message in response to the SIP request message, the SIP response message containing a P-Asserted-ldentity header field indicating that the network component is part of a trust domain, the P-Asserted-ldentity header field including an indicator indicating that the SIP request message for a dialog, sent by the UE, is an emergency-related request, and that the UE should include emergency-related information associated with the UE in a SIP request message within the dialog in response to the SIP response message, the emergency-related information comprising location information;
wherein the indicator comprises a number.

19. The method of claim 18, wherein the emergency-related information associated with the UE contained in the SIP request message within the dialog comprises a UE identity.

20. The method of claim 18, wherein the emergency-related information associated with the UE contained in the SIP request message within the dialog comprises a UE location.

21. The method of claim 18, wherein the emergency-related information associated with the UE contained in the SIP request message within the dialog comprises UE access network information.

22. The method of claim 18, wherein the network component is an E-CSCF (emergency call session control function).

23. The method of claim 18, wherein the SIP response message is one of a SIP 1xx or 200 (OK) response.

24. The method of claim 18, wherein the SIP request message within the dialog is one of:
a SIP ACK;
a SIP PRACK;
a SIP target refresh;
a SIP UPDATE; or
a SIP RE-INVITE request.

25. The method of claim 24, wherein the SIP request message is a SIP INVITE request.

26. The method of claim 19, wherein the UE identity is a globally routable user agent uniform resource identifier (GRUU).

27. The method of claim 20, wherein a geolocation header field of the SIP request message within the dialog includes a URI (Uniform Resource Identifier) that points to the UE location.

28. The method of claim 18, wherein a message body of the SIP request message within the dialog includes geographical location information of the UE as a PIDF location object.

29. The method of claim 18, wherein a contact header field of the SIP request message within the dialog includes a public GRUU value associated with a public user identity.

30. The method of claim 21, wherein the UE access network information is included in a P-Access-Network-lnfo header field in the SIP request message within the dialog and comprises one of a location identifier, a cell identifier or an identity of an WLAN access node.

31. The method of claim 18, wherein the emergency-related information associated with the UE is not contained in the SIP request message for a dialog.

32. The method of claim 18, wherein the indicator indicating that a SIP request message for a dialog is an emergency-related request comprises a Uniform Resource Name ("URN").

33. The method of claim 18, wherein the indicator indicates a PSAP function.

34. The method of claim 18, wherein the indicator indicates 911.

35. A non-transitory computer readable medium storing instructions to cause a processor to perform operations comprising:
  receiving from a user equipment ("UE") a Session Initiation Protocol ("SIP") request message for a dialog that is an emergency-related request;
  updating header information of the SIP request message for a dialog;
  forwarding the SIP request message for a dialog toward a Public Safety Answering Point ("PSAP"); and
  sending from the network component to the UE a SIP response message in response to the SIP request message, the SIP response message containing a P-Asserted-ldentity header field indicating that the network component is part of a trust domain, the P-Asserted-ldentity header field including an indicator indicating that the SIP request message for a dialog, sent by the UE, is an emergency-related request, and that the UE should include emergency-related information associated with the UE in a SIP request message within the dialog in response to the SIP response message, the emergency-related information comprising location information;
  wherein the indicator comprises a number.

36. The computer readable medium of claim 35, wherein the indicator indicates 911.

37. The computer readable medium of claim 35, wherein the emergency-related information associated with the UE is not contained in the SIP request message for a dialog.

38. The computer readable medium of claim 35, wherein the indicator indicating that a SIP request message for a dialog is an emergency-related request comprises a Uniform Resource Name ("URN").

39. The computer readable medium of claim 35, wherein the indicator indicates a PSAP function.

40. The computer readable medium of claim 35, wherein the indicator indicates 911.

* * * * *